United States Patent
Fang et al.

(10) Patent No.: US 11,447,130 B2
(45) Date of Patent: Sep. 20, 2022

(54) BEHAVIOR PREDICTION METHOD, BEHAVIOR PREDICTION APPARATUS AND VEHICLE CONTROL APPARATUS

(71) Applicant: Nissan Motor Co., Ltd., Yokohama (JP)

(72) Inventors: Fang Fang, Kanagawa (JP); Takuya Nanri, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 17/442,990

(22) PCT Filed: Mar. 28, 2019

(86) PCT No.: PCT/IB2019/000381
§ 371 (c)(1),
(2) Date: Sep. 24, 2021

(87) PCT Pub. No.: WO2020/194018
PCT Pub. Date: Oct. 1, 2020

(65) Prior Publication Data
US 2022/0144261 A1    May 12, 2022

(51) Int. Cl.
*B60W 30/095*    (2012.01)
*B60W 30/18*    (2012.01)
(Continued)

(52) U.S. Cl.
CPC .. *B60W 30/0956* (2013.01); *B60W 30/18154* (2013.01); *B60W 40/04* (2013.01);
(Continued)

(58) Field of Classification Search
CPC .... B60W 40/105; B60W 40/06; B60W 40/04; B60W 30/18154; B60W 2555/60;
(Continued)

(56) References Cited

U.S. PATENT DOCUMENTS

2007/0222566 A1* 9/2007 Tsuji .................... G06V 20/56
                                                          348/148
2010/0205132 A1* 8/2010 Taguchi ................ G08G 1/166
                                                          706/46
(Continued)

FOREIGN PATENT DOCUMENTS

JP        2000-6685 A      1/2000
JP        2007-1383 A      1/2007
(Continued)

OTHER PUBLICATIONS

Schulz, Jens et al. "Interaction-Aware Probabilistic Behavior Prediction in Urban Environments." 2018 IEEE/RSJ International Conference on Intelligent Robots and Systems (IROS) (2018): 3999-4006.

*Primary Examiner* — Peter D Nolan
*Assistant Examiner* — Ce Li Li
(74) *Attorney, Agent, or Firm* — Young Basile Hanlon & MacFarlane, P.C.

(57) ABSTRACT

A behavior prediction apparatus specifies a first object that affects a behavior of a vehicle from objects present around the vehicle. The behavior prediction apparatus performs a prediction process of extracting a second object that affects a behavior of the first object among a plurality of objects present around the first object and predicting a behavior. The behavior prediction apparatus sets the extracted second object as a new first object, and performs a prediction process of extracting a new second object affecting the behavior of the new first object and predicting the behavior. The behavior prediction apparatus repeats the prediction process by a predetermined number of times. The behavior prediction apparatus predicts the behavior of the first object in the first prediction process based on the behavior of each of the second objects subjected to the prediction process.

16 Claims, 20 Drawing Sheets

(51) Int. Cl.
*B60W 40/04* (2006.01)
*B60W 40/06* (2012.01)
*B60W 40/105* (2012.01)
*G06V 20/58* (2022.01)
*G06V 20/56* (2022.01)

(52) U.S. Cl.
CPC .......... *B60W 40/06* (2013.01); *B60W 40/105* (2013.01); *G06V 20/58* (2022.01); *G06V 20/588* (2022.01); *B60W 2540/18* (2013.01); *B60W 2552/05* (2020.02); *B60W 2552/53* (2020.02); *B60W 2554/406* (2020.02); *B60W 2554/408* (2020.02); *B60W 2554/4046* (2020.02); *B60W 2554/4049* (2020.02); *B60W 2555/60* (2020.02)

(58) Field of Classification Search
CPC ......... B60W 2552/53; B60W 2552/05; B60W 2540/18; G06V 40/103
See application file for complete search history.

(56) References Cited

U.S. PATENT DOCUMENTS

| | | | |
|---|---|---|---|
| 2013/0151058 A1* | 6/2013 | Zagorski | G05D 1/0289 701/1 |
| 2016/0318518 A1* | 11/2016 | Suzuki | B60W 50/0097 |
| 2018/0322784 A1* | 11/2018 | Schild | G08G 1/163 |
| 2019/0311272 A1* | 10/2019 | Kamata | G05D 1/0088 |
| 2020/0130685 A1* | 4/2020 | Nguyen | B60W 60/001 |
| 2020/0180615 A1* | 6/2020 | Yang | B60W 30/0953 |

FOREIGN PATENT DOCUMENTS

| | | |
|---|---|---|
| JP | 2008-87545 A | 4/2008 |
| JP | 2016-203942 A | 12/2016 |

* cited by examiner

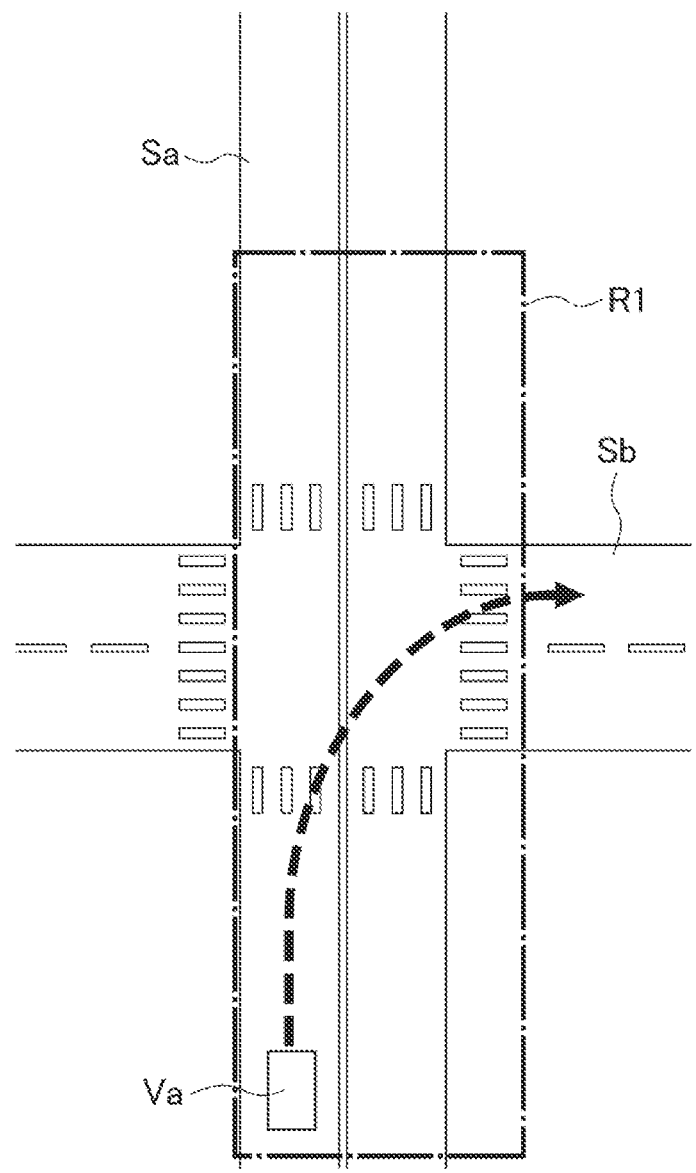

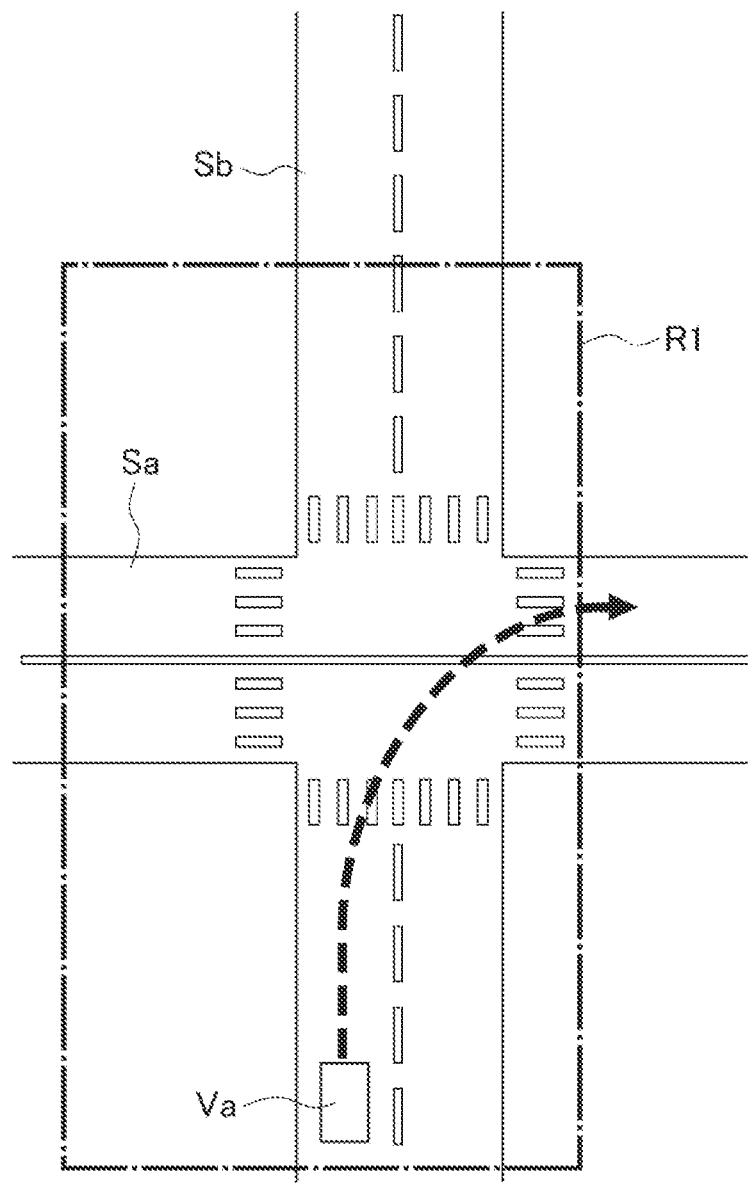

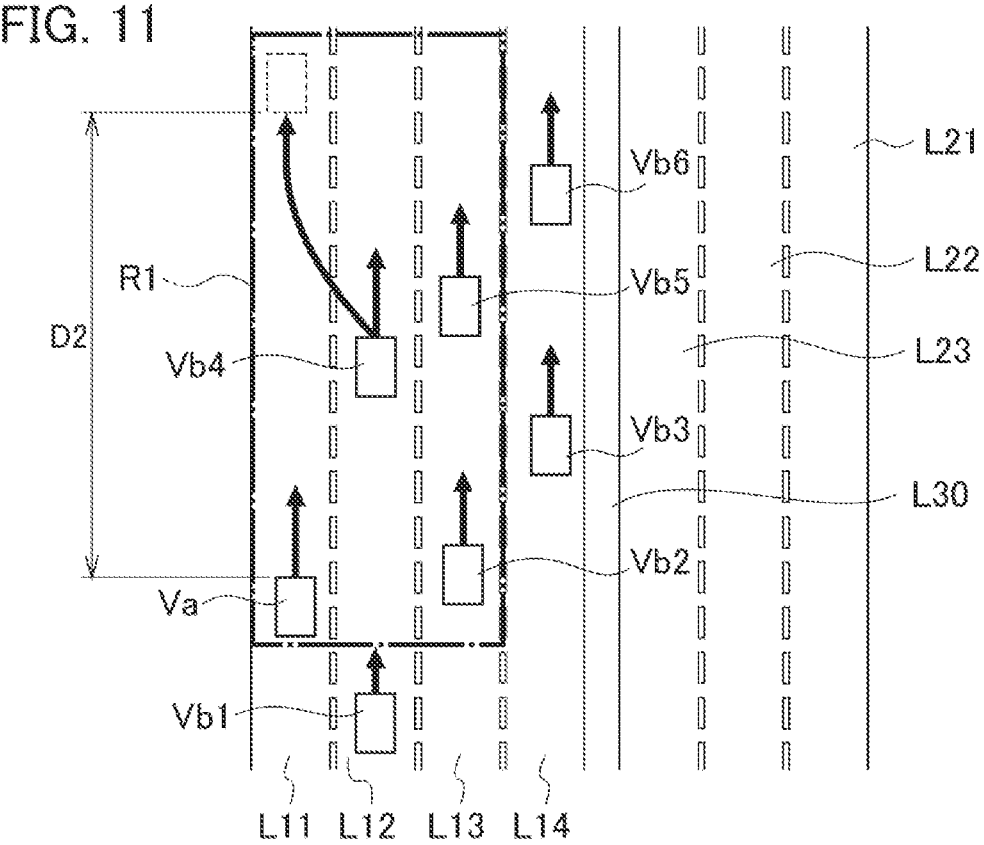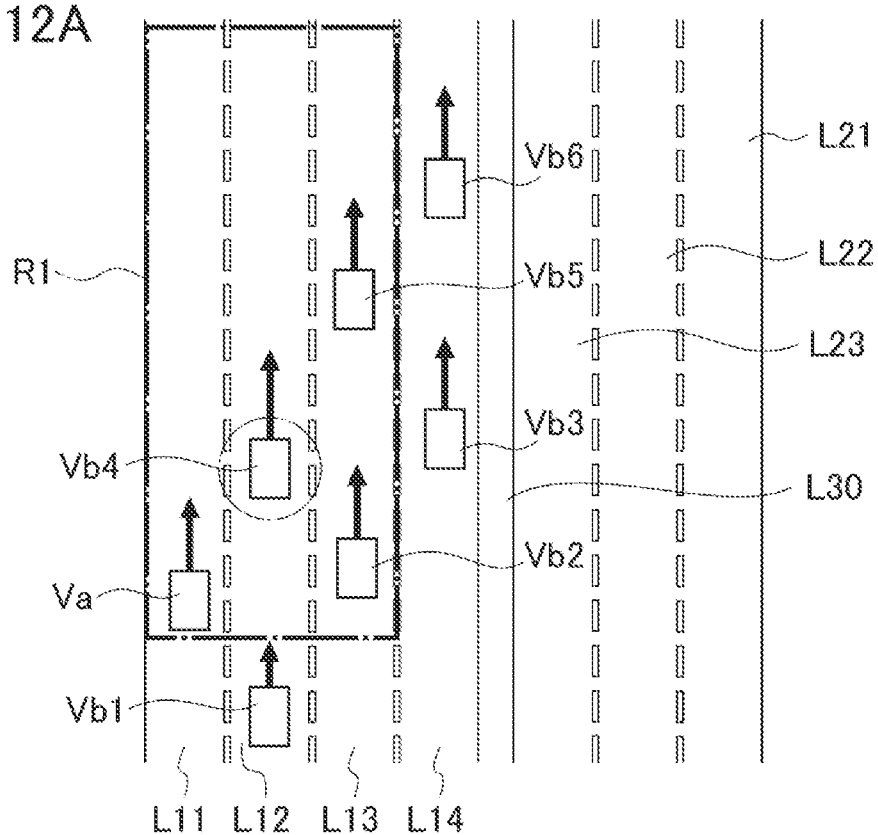

BEHAVIOR PREDICTION METHOD, BEHAVIOR PREDICTION APPARATUS AND VEHICLE CONTROL APPARATUS

TECHNICAL FIELD

The present invention relates to a behavior prediction method, a behavior prediction apparatus, and a vehicle control apparatus.

BACKGROUND

Conventionally, a technique of predicting the behavior of an object around a vehicle and controlling the vehicle based on the predicted behavior of the objects has been known. For example, Japanese Patent Application Publication No. 2008-87545 discloses a travelling control device for controlling travelling of a host-vehicle based on a travelling state of a vehicle ahead that travels forward the host-vehicle. The travelling control device determines a driving characteristic of the vehicle ahead based on driving operation information of the vehicle ahead that travels forward the host-vehicle, and predicts the traveling state of the vehicle ahead based on the determined driving characteristic. Then, the travelling control device controls the traveling of the host-vehicle based on the predicted traveling state of the vehicle ahead.

SUMMARY

However, according to the technique disclosed in Japanese Patent Application Publication No. 2008-87545, the behavior of the vehicle ahead is predicted based on the driving characteristic of the vehicle ahead, and thus, an inconvenience is caused that a situation can be predicted only in the short term.

The present invention is made in view of the above described problems, and an object of the present invention is to provide a behavior prediction method, a behavior prediction apparatus and a vehicle control apparatus that can predict a situation around a vehicle in the long term.

In a behavior prediction method according to an aspect of the present invention, a first object that affects the behavior of a vehicle is specified among objects present around the vehicle. Further, in the behavior prediction method, a prediction process of extracting a second object that affects the behavior of the first object among a plurality of objects present around the first object, and predicting the behavior is performed. In the behavior prediction method, the extracted second object is set as a new first object, and a prediction process of extracting a new second object that affects the behavior of the new first object and predicting the behavior is performed. In the behavior prediction method, the prediction process is repeated by a predetermined number of times. In the behavior prediction method, the behavior of the first object is predicted based on the behavior of each of the second objects subjected to the prediction process.

According to the present invention, it is possible to predict a situation around a vehicle in the long term.

BRIEF DESCRIPTION OF THE DRAWINGS

FIG. 7A is an explanatory diagram illustrating an example of a range of a first area set around a host-vehicle at an intersecting point without a traffic light;

FIG. 7B is an explanatory diagram illustrating an example of a range of a first area set around a host-vehicle at an intersecting point without a traffic light

FIG. 11 is an explanatory diagram illustrating a concept of extracting a first object on a straight road FIG. 12A is an explanatory diagram illustrating a concept of extracting a second object on a straight road;

DETAILED DESCRIPTION

Figure 1:
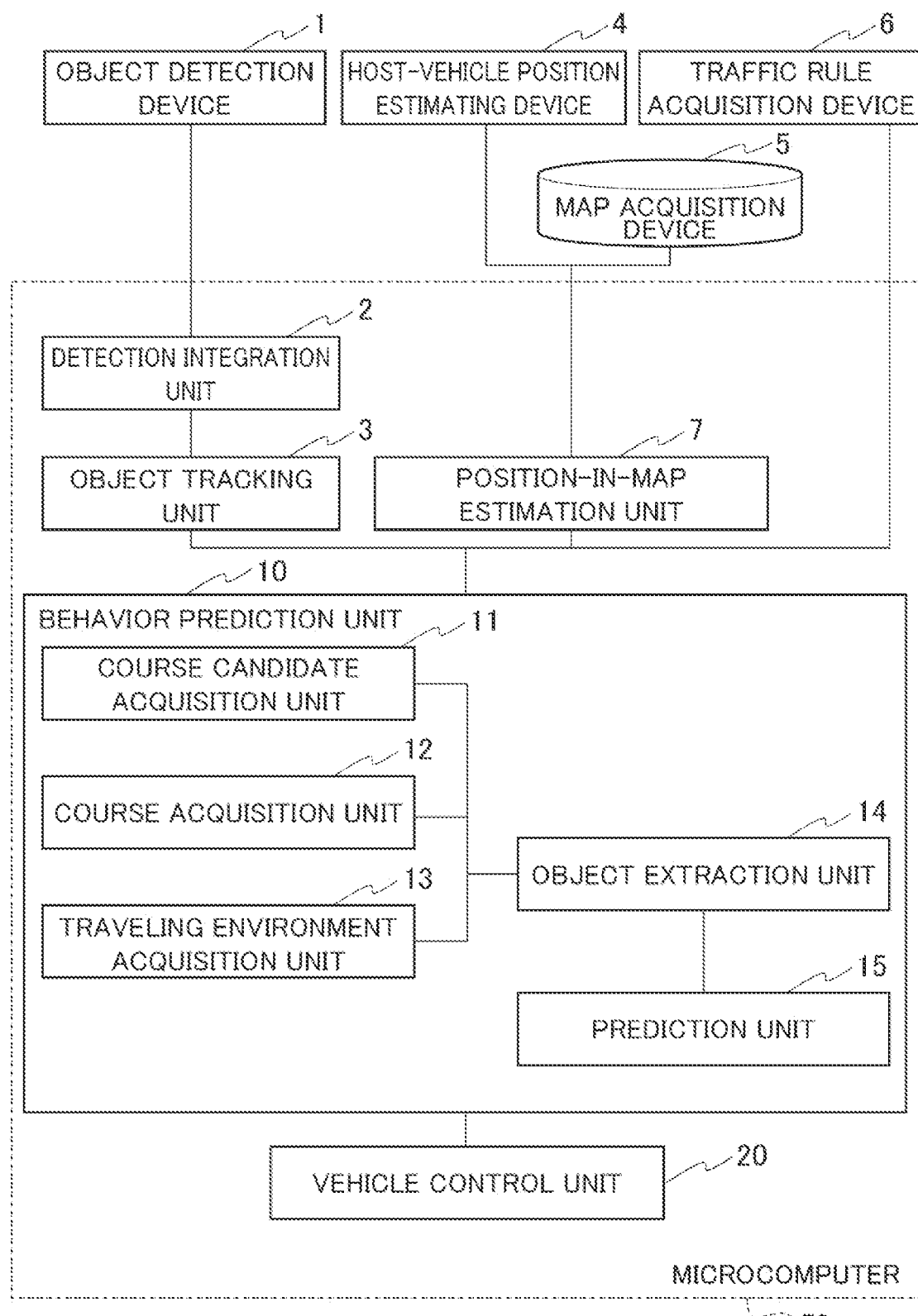
FIG. 1 is a block diagram illustrating a constitution of a behavior prediction apparatus according to the present embodiment.

Embodiments of the present invention will be described below with reference to the drawings. In the illustrations of the drawings, the same parts are denoted with the same reference numerals, and the description thereof is omitted.

With reference to FIG. 1, a constitution of a behavior prediction apparatus according to the present embodiment will be described. The behavior prediction apparatus includes an object detection device 1, a host-vehicle position estimating device 4, a map acquisition device 5, the traffic rule acquisition device 6, and a microcomputer 50.

The behavior prediction apparatus may be applied to a vehicle with an automatic driving function or alternatively may be applied to a vehicle without the automatic driving function. Further, the behavior prediction apparatus may be applied to a vehicle capable of switching between automatic driving and manual driving. Hereinafter, a vehicle applied with the behavior prediction apparatus is referred to as a host-vehicle.

The automatic driving indicates a state in which, for example, at least any one of actuators such as a brake, an accelerator, and steering is controlled without being operated by an occupant. Therefore, no problems are caused even if other actuators are actuated through an operation by an occupant. Further, the automatic driving may be a state in which any control such as acceleration/deceleration control and lateral position control is performed. Further, the manual driving according to the present embodiment indicates, for example, a state in which a brake, an accelerator, and a steering are operated by an occupant.

The object detection device 1 has a plurality of object detection sensors such as a laser radar, a millimeter-wave radar, and a camera mounted on the host-vehicle thereof. The object detection device 1 detects the objects around the host-vehicle by using the plurality of object detection sensors. The object detection device 1 detects moving objects including other vehicles, motorcycles, bicycles and pedestrians, and stationary objects including parked vehicles and buildings. For example, the object detection device 1 detects positions, attitudes (yaw angles), sizes, speeds, accelerations, decelerations, and yaw rates of the moving objects and the stationary objects relative to the host-vehicle.

The host-vehicle position estimating device 4 measures an absolute position of the host-vehicle by using a position estimation technique such as GPS (global positioning system) and odometry. The host-vehicle position estimating device 4 measures the absolute position of the vehicle, that is, a position of the host-vehicle relative to a predetermined reference point, a vehicle speed, an acceleration, a steering angle, and an attitude of the host-vehicle by using a position detection sensor. The host-vehicle position estimating device 4 includes sensor for acquiring the behavior of the host-vehicle such as a GPS receiver, inertial navigation equipment, sensors provided to a brake pedal and an accelerator pedal, and a wheel speed sensor and a yaw rate sensor, a laser radar, a camera, and the like.

The map acquisition device 5 acquires map information indicating a structure of a road on which the host-vehicle travels. The map information acquired by the map acquisition device 5 includes road structures such as road environments, an absolute position of each lane, the relationship on how lanes are connected, and the relationship on relative positions, traffic rules, the road signs, and the like. The map information acquired by the map acquisition device 5 also includes pieces of facility information on parking lots, gas stations and the like. The map acquisition device 5 may have a map database stored with the map information, or alternatively may acquire the map information from an external map data server by using cloud computing. The map acquisition device 5 may acquire the map information through inter-vehicle communications and road vehicle communication.

The traffic rule acquisition device 6 acquires the traffic rules imposed to the host-vehicle based on environments, signs and the like of the road on which the host-vehicle travels. The traffic rule acquisition device 6 includes a communication device, a camera, and the like, and acquires the environments, signs, and the like of the road by using pieces of information acquired through the inter-vehicle communications or the road vehicle communication or pieces of information acquired from a camera and the like. The traffic rule acquisition device 6 acquires the traffic rules to be applied to the host-vehicle based on the acquired environments, the acquired signs and the like of the road. If the map acquisition device 5 can acquire the traffic rules as one of the pieces of map information, the traffic rule acquisition device 6 may be replaced by the map acquisition device 5.

The microcomputer 50 predicts behaviors of objects (typically, moving objects) present around the host-vehicle based on detection results by the object detection device 1, estimation results by the host-vehicle position estimating device 4, acquisition results by the map acquisition device 5, and acquisition results by the traffic rule acquisition device 6. The microcomputer 50 controls a traveling state of the host-vehicle based on predicted behaviors of the objects.

The behavior prediction according to the present embodiment is the prediction of behaviors of an object that affects the behaviors of the host-vehicle (hereinafter referred to as "a first object"). Further, the behavior prediction according to the present embodiment is the prediction of behaviors of a second object that affects behaviors of the first object, and the prediction of behaviors of the first object based on the behaviors of the second object.

The microcomputer 50 is a general-purpose microcomputer including a CPU (central processing unit), a memory, and an input/output unit. The microcomputer is installed with a computer program (a behavior prediction program) for causing the microcomputer to function as the behavior prediction apparatus. By executing the computer program, the microcomputer functions as a plurality of information processing circuits of the behavior prediction apparatus. The present embodiment shows an example where the plurality of information processing circuits of the behavior prediction apparatus are realized by software. However, it is also possible to configure each information processing circuits by preparing each dedicated hardware for performing each information process described below. Further, the plurality of information processing circuits may be configured by individual pieces of hardware.

The microcomputer 50 includes, as the plurality of information processing circuits, a detection integration unit 2, an object tracking unit 3, a position-in-map estimation unit 7, a behavior prediction unit 10 and a vehicle control unit 20.

The detection integration unit 2 integrates a plurality of detection results acquired from the respective plurality of object detection sensors of the object detection device 1, and outputs a detection result to each object. Specifically, by taking into consideration of an error characteristic and the like of each object detection sensor, the detection integration unit 2 calculates a reasonable behavior of an object in which an error becomes the smallest, from the behaviors of the objects acquired from the respective object detection sensors. Specifically, by using a known sensor fusion technique, the detection integration unit 2 comprehensively evaluates the detection results acquired from the plurality of object detection sensors, and then acquires accurate detection results.

The object tracking unit 3 tracks an object detected by the detection integration unit 2. Specifically, the object tracking unit 3 verifies (associates), from behaviors of objects output at different times, whether the objects output at the different times are identical, and tracks the output objects based on the association.

The position-in-map estimation unit 7 estimates a position and a direction of the host-vehicle on the map from an absolute position of the host-vehicle acquired by the host-vehicle position estimating device 4 and map information acquired by the map acquisition device 5. The position-in-map estimation unit 7 estimates on which the travelling lane the host-vehicle is located.

The behavior prediction unit 10 predicts behaviors of the objects present around the host-vehicle. The behavior prediction unit 10 includes a course candidate acquisition unit 11, a course acquisition unit 12, a traveling environment acquisition unit 13, an object extraction unit 14, and a prediction unit 15.

The course candidate acquisition unit 11 calculates a course candidate of an object based on map information, detection results of the objects present around the host-vehicle, information on a positions of the host-vehicle, and the traffic rules. The course candidate of the object is the candidate of the course selectable by the object.

The course acquisition unit 12 acquires a course of the host-vehicle. For example, the course acquisition unit 12 acquires route information set in a navigational device (not illustrated), and then acquires a course of the host-vehicle from the route information. The course acquisition unit 12 may calculate the course of the host-vehicle based on information on a destination and the map information.

The traveling environment acquisition unit 13 acquires an environment of a road on which the host-vehicle is currently traveling based on information on the position of the host-vehicle, the map information, and the like. The road environments indicate road types, such as expressways, intersecting points (i.e., traffic junctions where two or more routes converge, diverge, meet, or cross at the same height at a traffic light, roundabout, four-way stop, or the like.), and merging sections, and states of traffic congestion caused on the road.

The object extraction unit 14 extracts a target object whose behavior is to be predicted from the objects present around the host-vehicle based on a course candidate of the object, a course and a travelling state of the host-vehicle, a road environment of the host-vehicle, the traffic rules, and the like. Specifically, the object extraction unit 14 specifies (extracts) a first object (a first object for the first time) that affects the behavior of the host-vehicle from the objects present around the host-vehicle. Further, the object extraction unit 14 performs a process of extracting a second object that affects the behavior of the first object from the plurality of objects present around the first object (a prediction process). Furthermore, the object extraction unit 14 sets the extracted second object as a new first object, and then performs a process of extracting a second object (a new second object) that affects the behavior of the new first object (the prediction process). In this way, the object extraction unit 14 repeatedly extracts a second object that is a target object whose behavior is to be predicted by the predetermined number of extraction times that is determined in advance.

The prediction unit 15 performs a process of predicting the behavior of the second object extracted by the object extraction unit 14 (a prediction process) each time a target object whose behavior is to be predicted is extracted so as to repeatedly make the prediction by the predetermined number of extraction times that is determined in advance. Further, the prediction unit 15 predicts the behavior of the first object specified for the first time (the first object for the first time) based on behavior of n (n: natural numbers corresponding to the number of extraction times) second objects subjected to the prediction process.

The vehicle control unit 20 controls the host-vehicle based on the behavior of the first object predicted by the behavior prediction unit 10. The vehicle control unit 20 controls various actuators (a steering actuator, an accelerator pedal actuator, a brake actuator and the like) of the host-vehicle to perform an automatic traveling control or a traveling support control (for example, a deceleration control).

In the present embodiment, the microcomputer 50 has functions of the vehicle control unit 20 and thus, the behavior prediction apparatus may be applied as a vehicle control apparatus. However, the behavior prediction apparatus may only be provided with functions of predicting behaviors of objects present around the host-vehicle instead of having the functions of the vehicle control unit 20.

Figure 2:
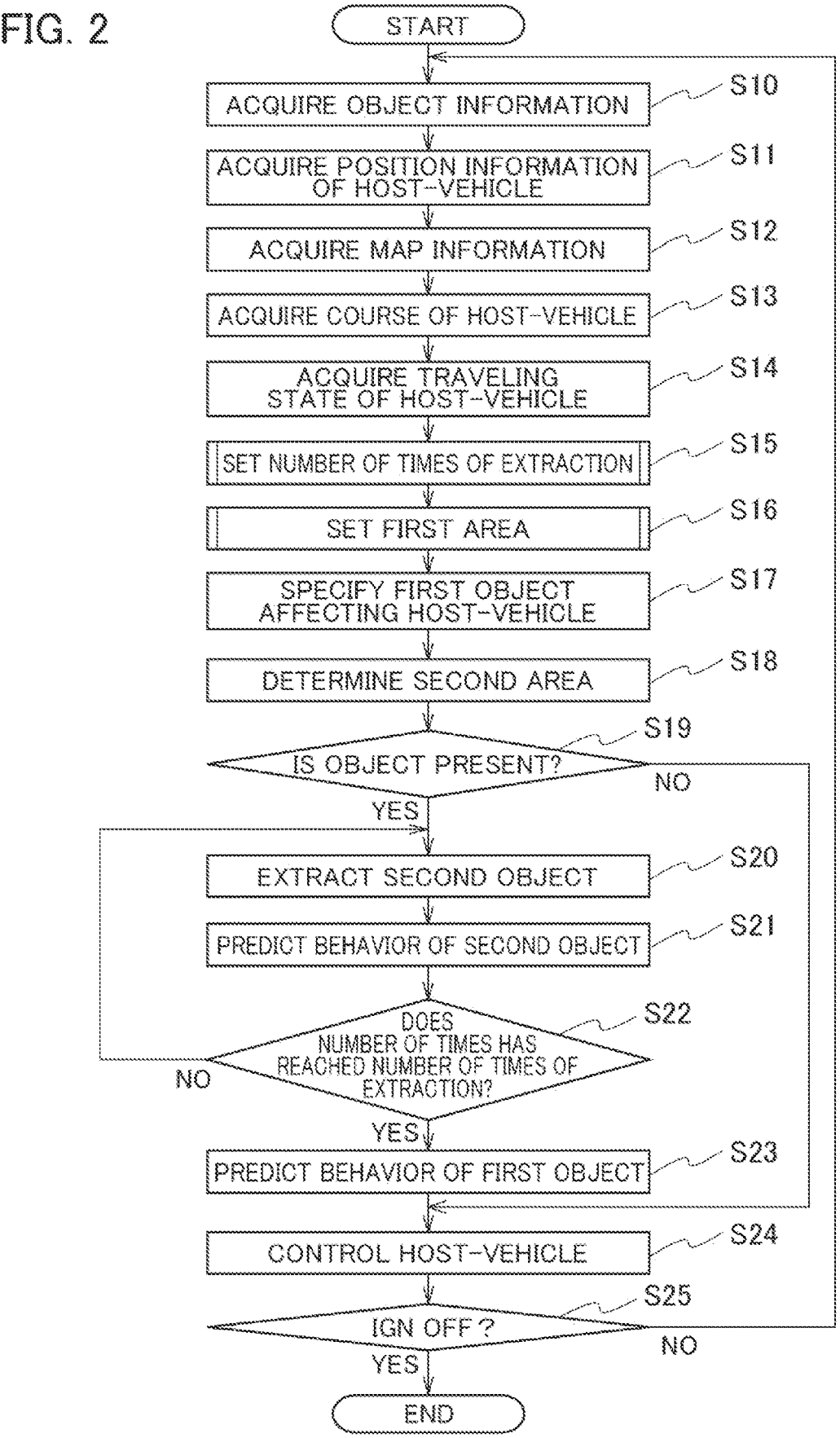
FIG. 2 is a flowchart illustrating procedures of processes of predicting behaviors according to the present embodiment.

Next, with reference to FIG. 2, procedures of processes of predicting behaviors according to the present embodiment will be described. The procedures of processes are called by regarding the turning on of an ignition switch (IGN) as a trigger and are performed by the microcomputer 50. If the host-vehicle is an electric vehicle, the turning on of a power switch may be used as a trigger instead of using the turning on of the ignition switch as a trigger.

First, in step S10, the detection integration unit 2 acquires, from the object detection device 1, object information that is information on objects present around the host-vehicle. After acquiring the object information, the detection integration unit 2 calculates the behaviors of the objects based on the object information. The object tracking unit 3 tracks the objects detected by the detection integration unit 2.

In step S11, the position-in-map estimation unit 7 acquires information on the positions of the host-vehicle from the host-vehicle position estimating device 4.

In step S12, the position-in-map estimation unit 7 acquires the map information. The position-in-map estimation unit 7 calculates information on the position of the host-vehicle on the map, that is, on which travelling lane, the host-host-vehicle travels and a direction of the host-vehicle on the travelling lane. The course candidate acquisition unit 11 calculates information on the positions of the objects on the map, that is, positions (travelling lanes, a sidewalk and the like) and directions of the objects on the map based on the information on the position of the host-vehicle and the information on the objects present around the host-vehicle. The course candidate acquisition unit 11 acquires information on lanes, mainly objects, included in a certain range and traffic rules. The course candidate acquisition unit 11 can calculate course candidates of the objects based on the pieces of information.

In step S13, the course acquisition unit 12 acquires a course of the host-vehicle on the map. The course acquisition unit 12 can acquire the course of the host-vehicle from route information set in advance to a navigational device or the like. Alternatively, the course acquisition unit 12 may calculate route information based on destination information to acquire a course.

In step S14, the course acquisition unit 12 acquires a traveling state of the host-vehicle. As the travelling state, at least a vehicle speed and a steering angle are acquired.

Figure 3:
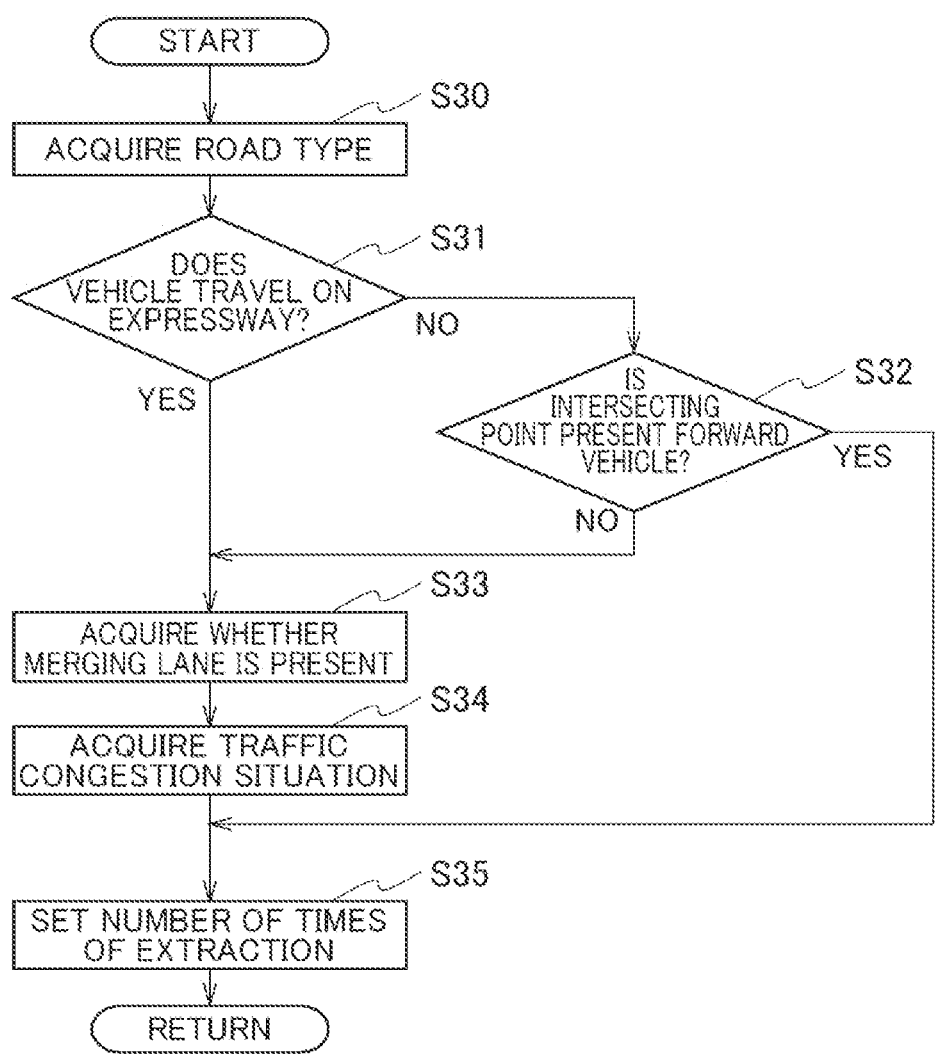
FIG. 3 is a flowchart illustrating procedure of processes of setting the number of times of extraction.

In step S15 an object extraction unit 14 sets the number of times of extraction based on road environments. The number of times of extraction is the number of times a prediction process is repeatedly performed on a second object. With reference to FIG. 3, the details of a process of setting the number of times of extraction will be described.

In step S30, the traveling environment acquisition unit 13 acquires a type of a road on which the host-vehicle travels based on information on a position of the host-vehicle and the map information.

In step S31, the traveling environment acquisition unit 13 determines whether the host-vehicle travels on an expressway. If the host-vehicle travels on the expressway, it is determined as YES in step S31, and a process proceeds to step S33. On the other hand, if the host-vehicle travels on a general road instead of the expressway, it is determined as NO in step S31, and a process proceeds to step S32.

In step S32, the traveling environment acquisition unit 13 determines whether an intersecting point is present ahead of the host-vehicle. The traveling environment acquisition unit 13 determines whether an intersecting point is present based on, for example, a time required for the host-vehicle to reach the center of the intersecting point or a distance between the host-vehicle and the center of the intersecting point. If an intersecting point is present ahead of the host-vehicle, it is determined as YES in step S32 and a process proceeds to step S35. On the other hand, if an intersecting point is absent ahead of the host-vehicle, it is determined as NO in step S32 and a process proceeds to step S33.

In step S33, the traveling environment acquisition unit 13 determines whether a merging lane is present ahead of the host-vehicle. If the host-vehicle travels on a main road of a merging section, the traveling environment acquisition unit 13 acquires information indicating that a spot where the merging lane merges is present in a predetermined range ahead of the host-vehicle. Alternatively, if the host-vehicle travels on the merging lane in the merging section, the traveling environment acquisition unit 13 acquires information indicating that a spot where the merging lane merges with the main road is present in the predetermined range ahead of the host-vehicle.

In step S34, the traveling environment acquisition unit 13 acquires situations of traffic congestions caused around the host-vehicle.

In step S35, a traveling environment acquisition unit 13 sets the number of times of extraction. The degree of complexity due to the intersection of objects differs depending on road environments. Generally, when the host-vehicle travels on a general road, various objects such as pedestrians and bicycles intersect, in addition to vehicles and motorcycles. Therefore, the degree of complexity due to the intersection of objects is higher when the host-vehicle travels on the general road than when the host-vehicle travels on an expressway in which types of passable objects are restricted. Further, if the host-vehicle travels on a general road and also travels at an intersecting point, various objects such as oncoming vehicles and pedestrians walking on a pedestrian crosswalk intersect when the host-vehicle intends to turn right or left, in addition to other vehicles travelling in the same direction and pedestrians walking on a road shoulder. Therefore, the degree of complexity due to the intersection of objects is higher when the host-vehicle is at the intersecting point than when the host-vehicle travels on straight roads (general roads except for intersecting points).

In other words, the degree of complexity due to the intersection of objects means the degree of intersection (the number of intersections) of course candidates of objects that is forecasted to occur in a road environment.

As the degree of complexity due to the intersection of objects is high, the number of times of extraction of the prediction process is more increased, and this enables the prediction of a situation around the host-vehicle in the long term, because mutual influences among a larger number of objects can be considered. Therefore, the traveling environment acquisition unit 13 sets the number of times of extraction based on the degree of complexity due to the intersection of objects caused in an environment of a road on which the host-vehicle travels. Specifically, the traveling environment acquisition unit 13 sets the number of times of extraction to become smaller in a descending order of an intersecting point, a general road, and an expressways. For example, it is set such that the process is performed 5 times for the intersecting point, 3 times for the straight road, and 2 times for the expressway. Further, even if there are the same traveling environments, the degree of complexity due to the intersection of objects becomes lower in one of the same travelling environments where the host-vehicle is caught in traffic congestion than the other of the same traveling environments where the host-vehicle is not caught in traffic congestion. Therefore, for example, it is set such that the number of times of extraction when the host-vehicle is caught in traffic congestion is set to be smaller than the number of times of extraction when the host-vehicle is not caught in traffic congestion.

The traveling environment acquisition unit 13 holds data defining a relationship among a road environment, the number of times of extraction, and a traffic congestion situation. The traveling environment acquisition unit 13 sets the number of times of extraction based on the road environment and the traffic congestion situation.

Figure 4:
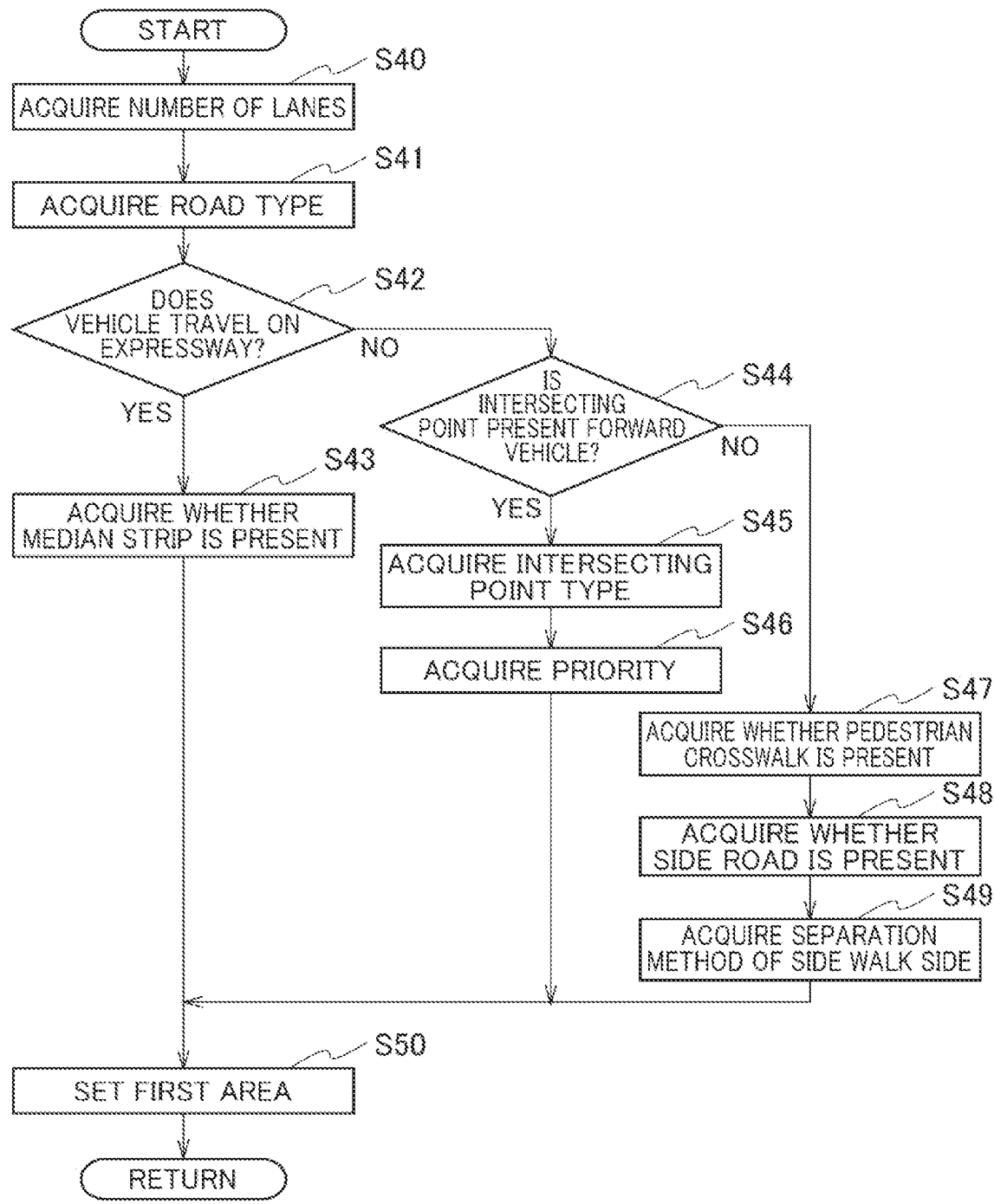
FIG. 4 is a flowchart illustrating procedures of processes of setting a first area.

In step S16, the object extraction unit 14 sets a first area based on the information on the position of the host-vehicle and the map information. The first area is an area for extracting a first object that affects the behavior of the host-vehicle, and is set around the host-vehicle. With reference to FIG. 4, procedures of processes for setting the first area will be described.

In step S40, the traveling environment acquisition unit 13 acquires the number of lanes of the road on which the host-vehicle travels.

In step S41, the traveling environment acquisition unit 13 acquires a type of the road on which the host-vehicle travels.

In step S42, the traveling environment acquisition unit 13 determines whether the host-vehicle travels on an expressway. If the host-vehicle travels on the expressway, it is determined as YES in step S42, and a process proceeds to step S43. On the other hand, if the vehicle travels on a general road instead of the expressway, it is determined as NO in step S42, and a process proceeds to step S44.

In step S43, the traveling environment acquisition unit 13 determines whether a median strip is present.

In step S44, the traveling environment acquisition unit 13 determines whether an intersecting point is present ahead of the host-vehicle. If the intersecting point is present ahead of the host-vehicle, it is determined as YES in step S44 and a process proceeds to step S45. Alternatively, if the intersecting point is absent ahead of the host-vehicle, it is determined as NO in step S44 and a process proceeds to step S47.

In step S45, the traveling environment acquisition unit 13 acquires types of intersecting points. Examples of types of intersecting points include, for example, an intersecting point with a traffic light, an intersecting point without a traffic light, a roundabout, a 4WAY STOP, an intersecting point with a stop line and the like.

In step S46, the traveling environment acquisition unit 13 acquires the priority at an intersecting point set forth in traffic rules based on a type of an intersecting point and the information on the position of the host-vehicle. For example, when a signal of the host-vehicle is blue at an intersecting point with a traffic light, the object extraction unit 14 determines that the road of the host-vehicle has the higher priority than an intersecting road. Further, if a stop line is present ahead of the host-vehicle at an intersecting point with a stop line, the object extraction unit 14 determines that the road of the host-vehicle has the lower priority than an intersecting road. On the other hand, if the stop line is absent ahead of the host-vehicle, the object extraction unit 14 determines that the road of the host-vehicle has the higher priority than an intersecting road. If a course of the host-vehicle at an intersecting point is a right turn, the object extraction unit 14 determines that a lane of the host-vehicle has the lower priority than an oncoming straight lane.

In step S47, the traveling environment acquisition unit 13 determines whether a pedestrian crosswalk is present ahead of the host-vehicle.

In step S48, the traveling environment acquisition unit 13 determines whether a side road is present ahead of the host-vehicle.

In step S49, the traveling environment acquisition unit 13 acquires a separation method between the road of the host-vehicle and a sidewalk. The separation method includes various methods such as, for example, planting, fences, guardrails, and un-separation methods.

In step S50, the object extraction unit 14 sets the first area based on the traveling state of the host-vehicle and the road environments acquired in steps S40 to S49. Hereinafter, how to set the first area will be described with reference to FIGS. 5A to 8D.

Figure 5A:
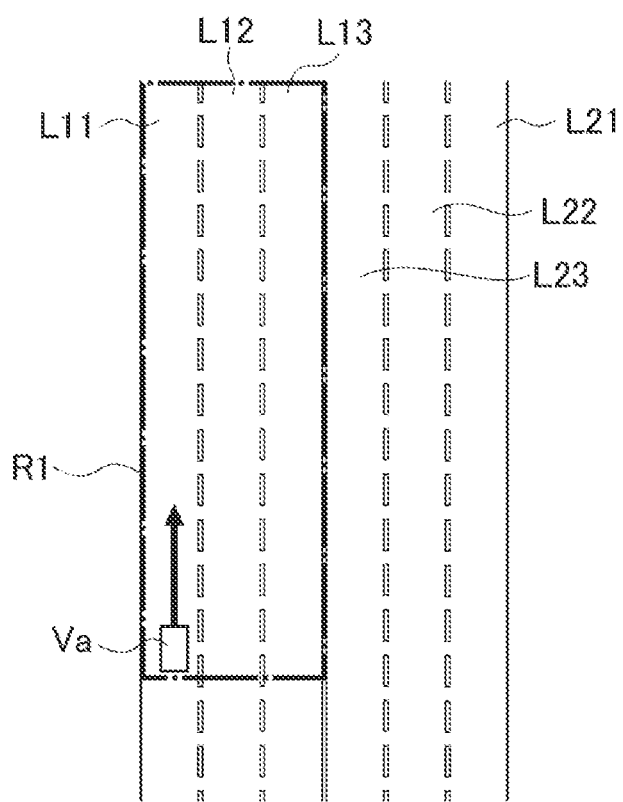
FIG. 5A is an explanatory diagram illustrating an example of a left-right range of a first area set around a host-vehicle on a straight road.
Figure 5B:
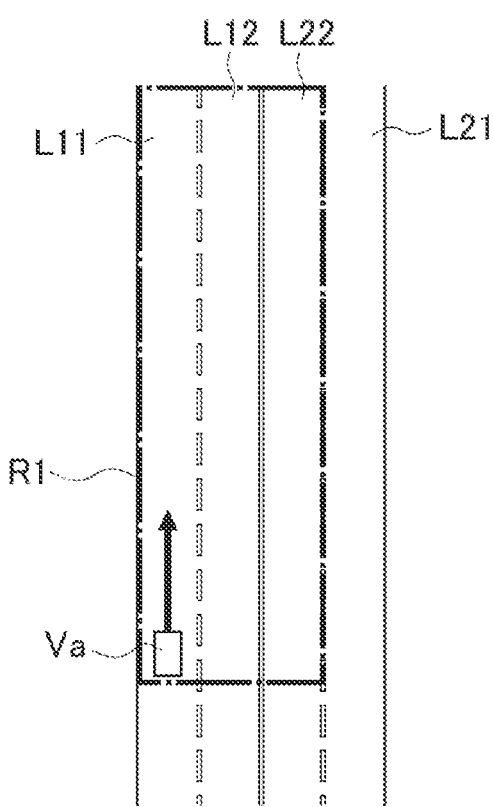
FIG. 5B is an explanatory diagram illustrating an example of a left-right range of a first area set around a host-vehicle on an expressway.
Figure 5C:
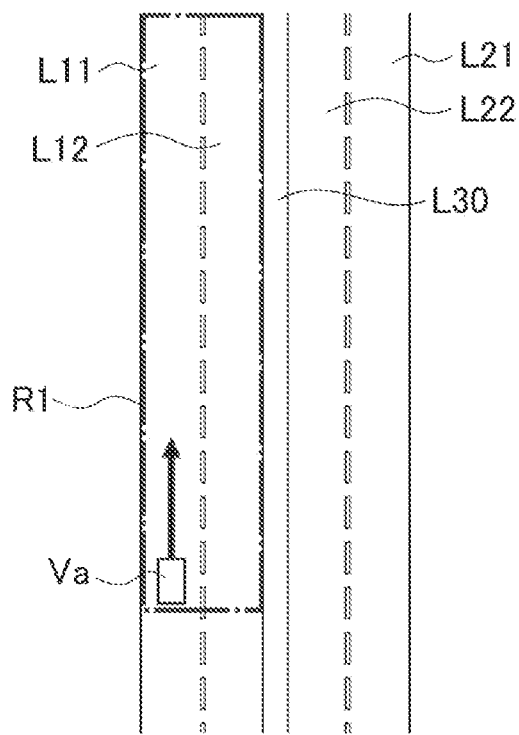
FIG. 5C is an explanatory diagram illustrating an example of a left-right range of a first area set around a host-vehicle on an expressway.
Figure 6:
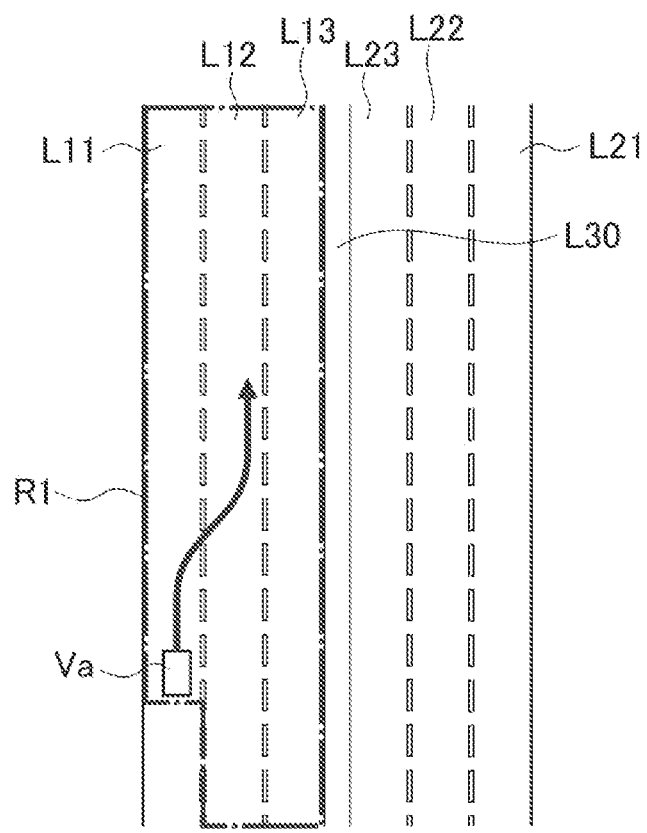
FIG. 6 is an explanatory diagram illustrating an example of a forward-backward range of a first area set around a host-vehicle on an expressway.

With reference to FIGS. 5A to 6, how to set the first area R1 when the host-vehicle travels on an expressway will be described. In FIGS. 5A to 6, a travelling lane is denoted with a reference numeral L11, an oncoming lane is denoted with a reference numeral L21, and the host-vehicle is denoted with a reference numeral Va. When the number of lanes is more than one, travelling lanes are denoted with reference numerals L11 and L12 and oncoming lanes are denoted with reference numerals L21 and L22. It is also assumed that the host-vehicle Va travels on the travelling lane L11 at a side most close to a road shoulder.

First, a left-right range of the first area R1 will be described. Basically, the object extraction unit 14 sets, as the first area R1, a range including a travelling lane of the host-vehicle Va, a second lane adjacent to a side of the oncoming lane when viewed from the travelling lane, and a third lane adjacent to a side of the oncoming lane when viewed from the second lane based on the travelling lane on which the host-vehicle Va travels. For example, in a case of a road having 3 lanes on each side, as illustrated in FIG. 5A, 3 travelling lanes L11, L12, and L13 form the first area R1.

As illustrated in FIG. 5B, when a third lane most distant from the host-vehicle Va includes the oncoming lane, the first area R1 is set to be a range including an oncoming lane L22 closest to the host-vehicle Va. Alternatively, as illustrated in FIG. 5C, if a median strip L30 is present, the first area R1 is set to be a range not including the oncoming lane.

Next, a forward-backward range of the first area R1 will be described. The object extraction unit 14 sets, as the first area R1, a range from the host-vehicle Va to a position that is forward the host-vehicle Va and is distant from the host-vehicle Va by a distance in which TTC (Time-To-Collision) is equal to or less than a predetermined time. For example, if the TTC is set to be 5 seconds and the host-vehicle Va is set to travel at 80 km/h, the first area R1 has a distance from the position of the host-vehicle Va to a position that is forward the host-vehicle Va and is distant from the host-vehicle Va by about 100 m. A range backward the host-vehicle Va is set in accordance with a course of the host-vehicle Va. For example, if the host-vehicle Va intends to change a lane as a course, it is necessary to consider, as a first object, another vehicle traveling on a lane to which the host-vehicle Va moves after a lane change and another vehicle entering the lane to which the host-vehicle Va moves after the lane change. Therefore, as illustrated in FIG. 6, the object extraction unit 14 sets, as the first area R1, a distance from the position of the host-vehicle Va to a position that is backward the host-vehicle Va and is distant from the host-vehicle Va by the distance in which the TTC is equal to or less than the predetermined time (for example, 3 seconds).

With reference to FIGS. 7A and 7B, how to set the first area R1 when the host-vehicle enters an intersecting point without a traffic light will be described. FIGS. 7A and 7B illustrate a road Sa having the travelling lane on which the host-vehicle Va travels and the oncoming lane, an intersecting road Sb intersecting the road Sa, and the host-vehicle Va.

First, a forward-backward range of the first area R1 will be described. The object extraction unit 14 sets a range from a position of the host-vehicle Va to a position that is forward the host-vehicle Va and is distant by a predetermined reference distance from the host-vehicle Va, as the first area R1. The reference distance is a distance in which a difference between a time required for the host-vehicle Va to reach the center of the intersecting point and a time required for an oncoming vehicle to reach the center of the intersecting point is equal to or less than a defined time, when it is assumed that the oncoming vehicle travels at the same speed as the host-vehicle Va. For example, if a distance from a position of the host-vehicle Va to the center of the intersecting point is 30 m, a speed is 10 m/s, and a time difference is 3 seconds, a distance from the center of the intersecting point to the oncoming vehicle is 60 m. Therefore, the object extraction unit 14 sets a distance from a position of the host-vehicle Va to a positon that is forward the host-vehicle Va and is distant by 90 from the host-vehicle Va as the first area R1.

Next, a left-right range of the first area R1 will be described. The object extraction unit 14 sets the first area R1 based on the priority of the host-vehicle Va at an intersecting point and a course of the host-vehicle Va. As illustrated in FIG. 7A, if the road of the host-vehicle Va has the higher priority, the object extraction unit 14 sets a range obtained by adding a predetermined margin to a pedestrian crosswalk intersecting a right turn course of the host-vehicle Va as the first area R1. As illustrated in FIG. 7B, if the road of the host-vehicle Va has the lower priority, the object extraction unit 14 sets the first area R1 in the same way as the setting of the forward-backward range.

With reference to FIGS. 8A to 8D, how to set the first area R1 when the host-vehicle Va travels on a straight road of a general road will be described. First, a forward-backward range of the first area R1 will be described. The object extraction unit 14 sets a range from a position of the host-vehicle Va to a position that is forward the host-vehicle Va and is distant from the host-vehicle Va by a distance in which the TTC is equal to or less than the predetermined time as the first area R1. For example, the TTC is 3 seconds.

Figure 8A:
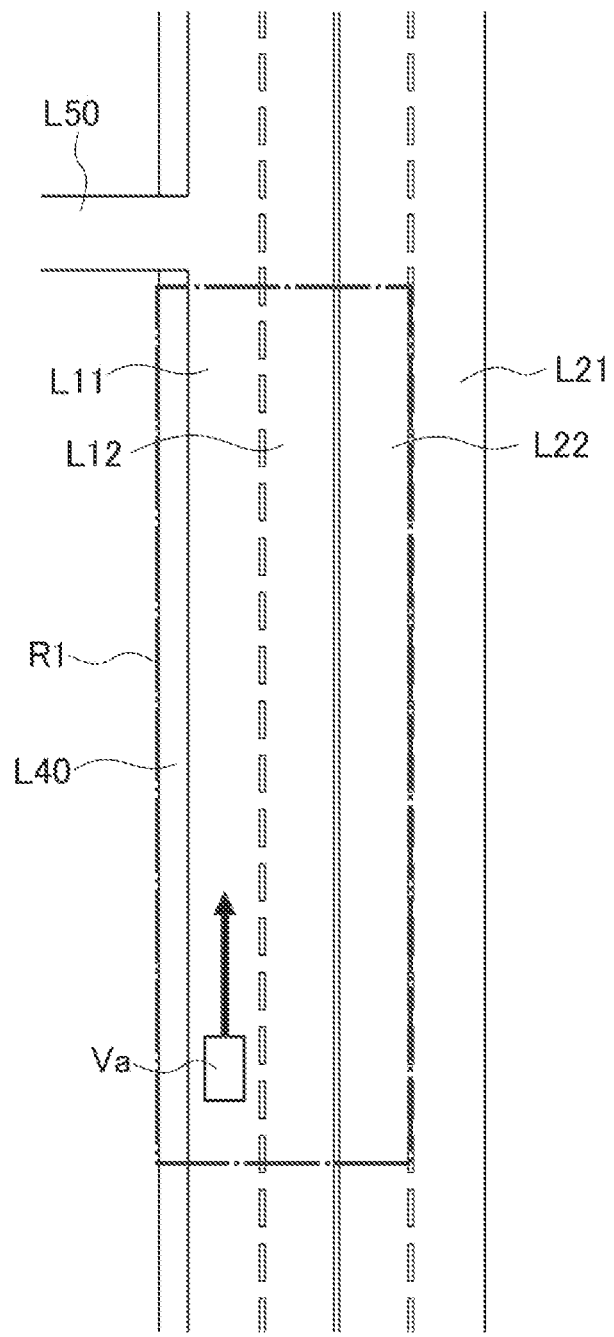
FIG. 8A is an explanatory diagram illustrating an example of a range of a first area set around a host-vehicle on a straight road of a general road.
Figure 8B:
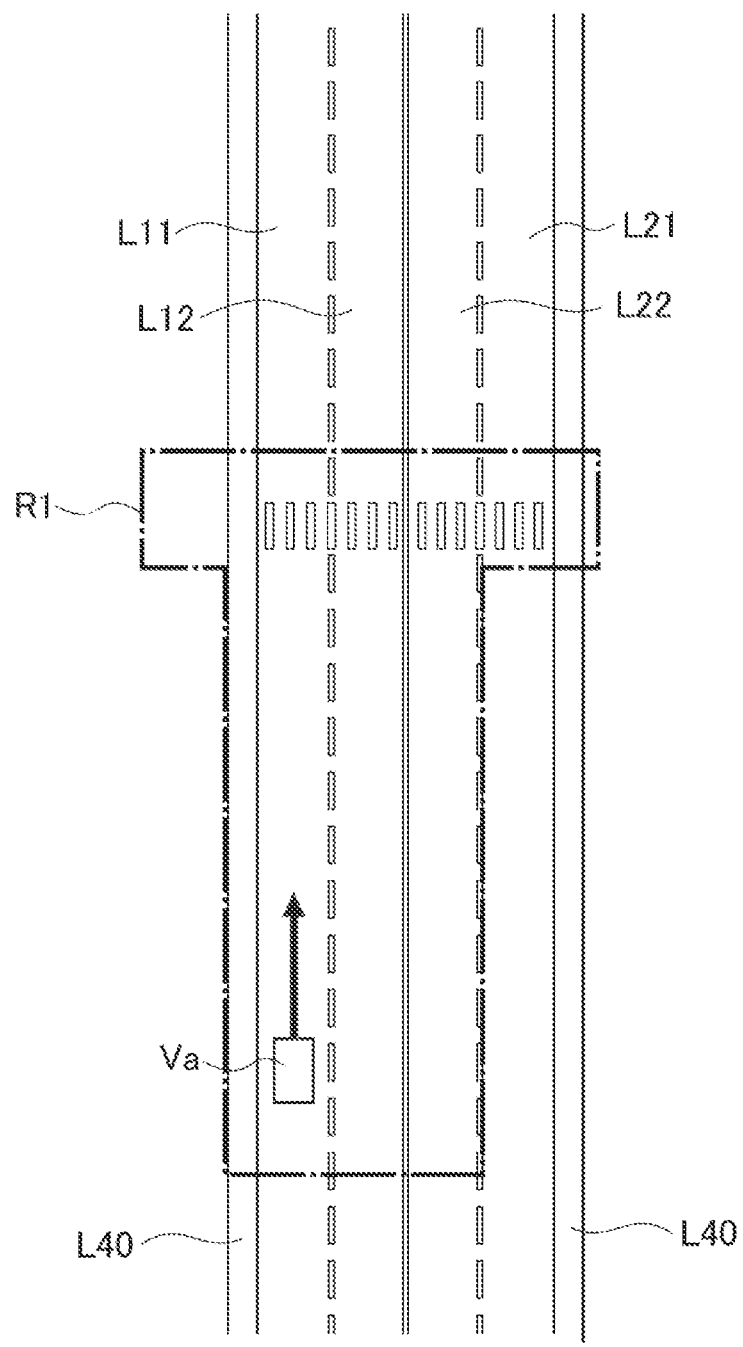
FIG. 8B is an explanatory diagram illustrating an example of a range of a first area set around a host-vehicle on a straight road of a general road.
Figure 8C:
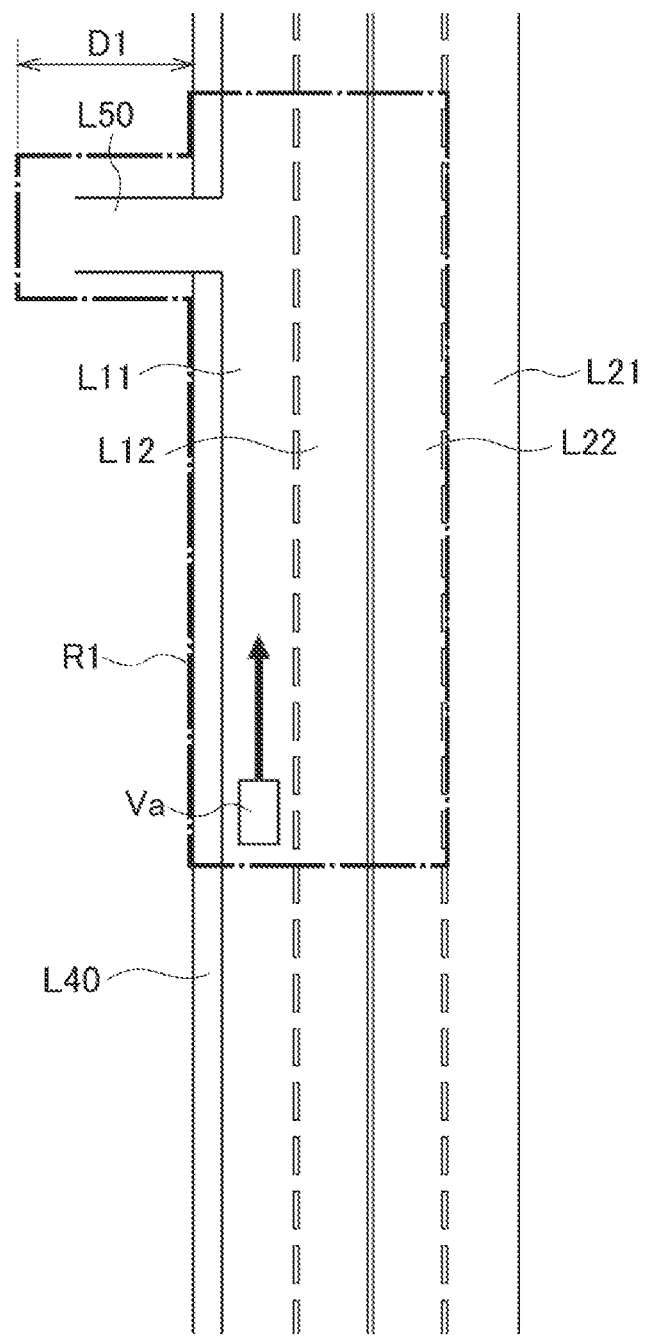
FIG. 8C is an explanatory diagram illustrating an example of a range of a first area set around a host-vehicle on a straight road of a general road.
Figure 8D:
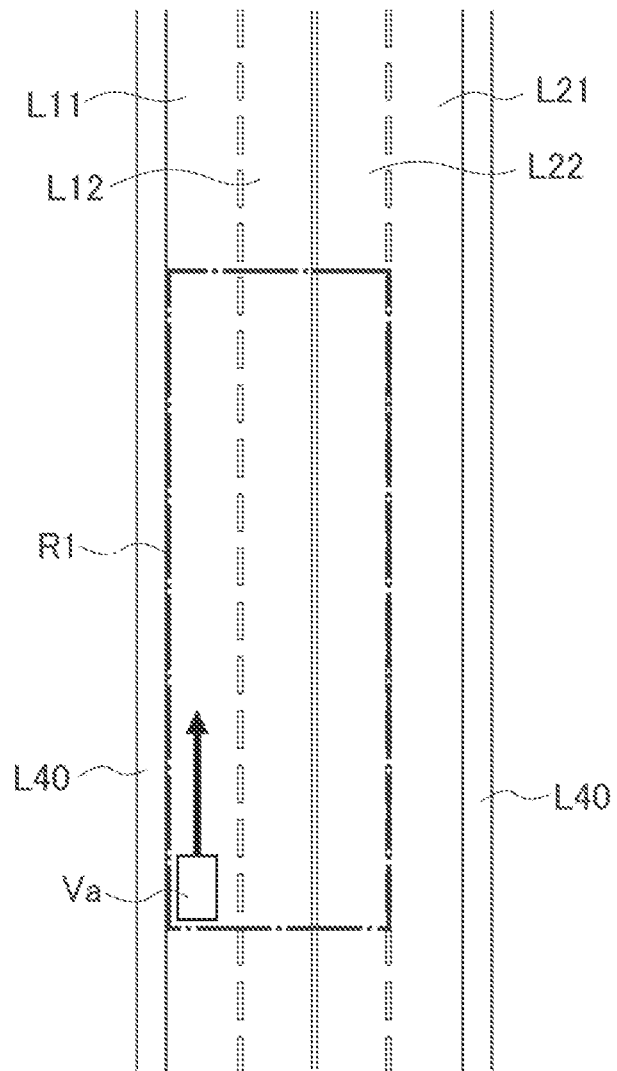
FIG. 8D is an explanatory diagram illustrating an example of a range of a first area set around a host-vehicle on a straight road of a general road.

Next, a left-right range of the first area R1 will be described. A left-right length is set based on whether a pedestrian crosswalk is present, whether a side road is present, and a separation method from a sidewalk, in addition to the number of lanes described above. For example, as illustrated in FIG. 8, the object extraction unit 14 sets the first area R1 to include a sidewalk L40 together with the 3 lanes described above. On the other hand, if the forward-backward range of the first area R1 includes a pedestrian crosswalk and a side road L50, the object extraction unit 14 increases the left-right range so as to include the pedestrian crosswalk and the side road L50. As illustrated in FIG. 8B, if the pedestrian crosswalk is included in the forward-backward range, the object extraction unit 14 increases a left-right width of an area corresponding to the pedestrian crosswalk. The increased width is a width in which a predetermined margin (for example, 2 meters) is added to the pedestrian crosswalk. As illustrated in FIG. 8C, if a connection position with the side road L50 is included in the forward-backward range, the object extraction unit 14 increases a left-right width of an area corresponding to the side road L50. The increased width D1 is, for example, 40 m. As illustrated in FIG. 8D, if the sidewalk L40 and the road are separated from each other, the object extraction unit 14 excludes the sidewalk L40 from the first area R1 to set the first area R1.

The first area R1 has been described by taking various road environments as examples. Note that the first area R1 set based on these methods sometimes becomes a range that is larger than a detection range of the object detection device 1. In this case, it is preferable that the object extraction unit 14 sets the first area R1 with the detection range of the object detection device 1 as an upper limit.

In step S17, the object extraction unit 14 extracts a first object that affects the behavior of the host-vehicle Va among objects present in the set first area R1. Specifically, the course acquisition unit 12 acquires a course of the host-vehicle. In the same way, the course candidate acquisition unit 11 calculates course candidates of the objects present in the first area R1 based on the map information, the pieces of position information of the objects, and the traffic rules. The object extraction unit 14 determines whether the objects affect the behavior of the host-vehicle Va based on whether the course of the host-vehicle Va intersects the course candidates of the objects present in the first area R1.

Figure 9:
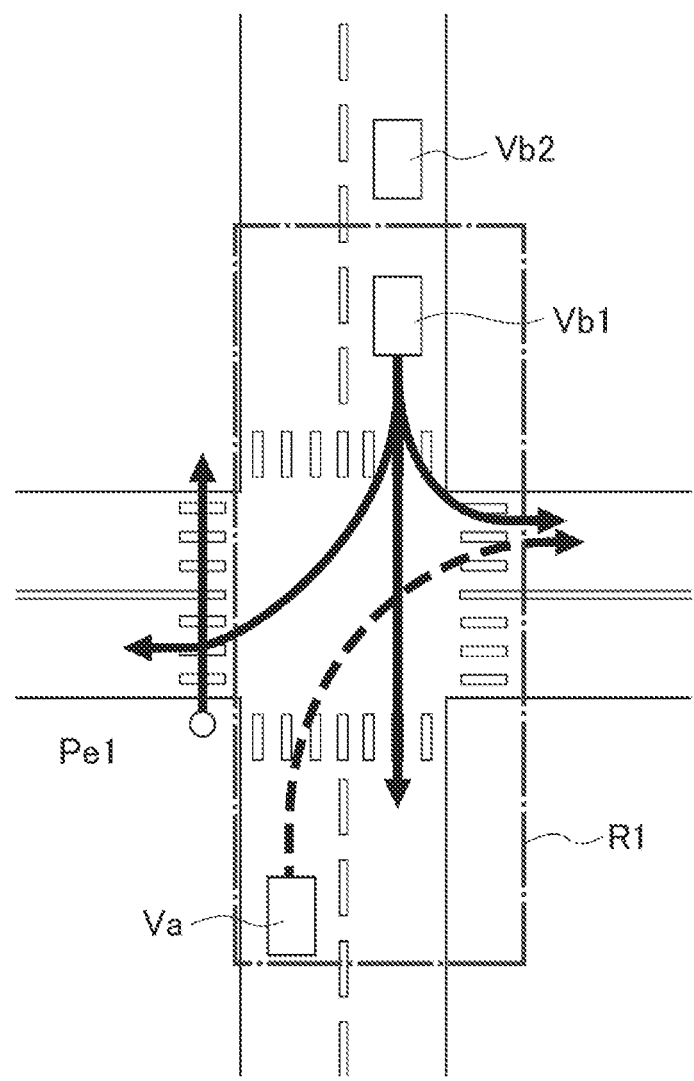
FIG. 9 is an explanatory diagram illustrating a concept of extracting a first object at an intersecting point.

FIG. 9 illustrates a traveling scene of the host-vehicle Va entering an intersecting point. Two other vehicle Vb1 and Vb2 traveling on an oncoming lane and a pedestrian Pe1 are present around the intersecting point. In the first area R1, another vehicle Vb1 that is a lead vehicle of vehicles travelling on the oncoming lane is present. A course of the host-vehicle Va is a right turn at the intersecting point. In this case, if another vehicle Vb1 travels straight, another vehicle Vb1 intersects the course of the host-vehicle Va, and thus, the object extraction unit 14 extracts another vehicle Vb1 as a first object. On the other hand, a pedestrian walking on a pedestrian crosswalk at a left turn side does not intersect the course of the host-vehicle Va and further, the pedestrian Pe1 is not present in the first area R1, and thus, the object extraction unit 14 does not extract the pedestrian Pe1 as the first object.

Figure 10A:
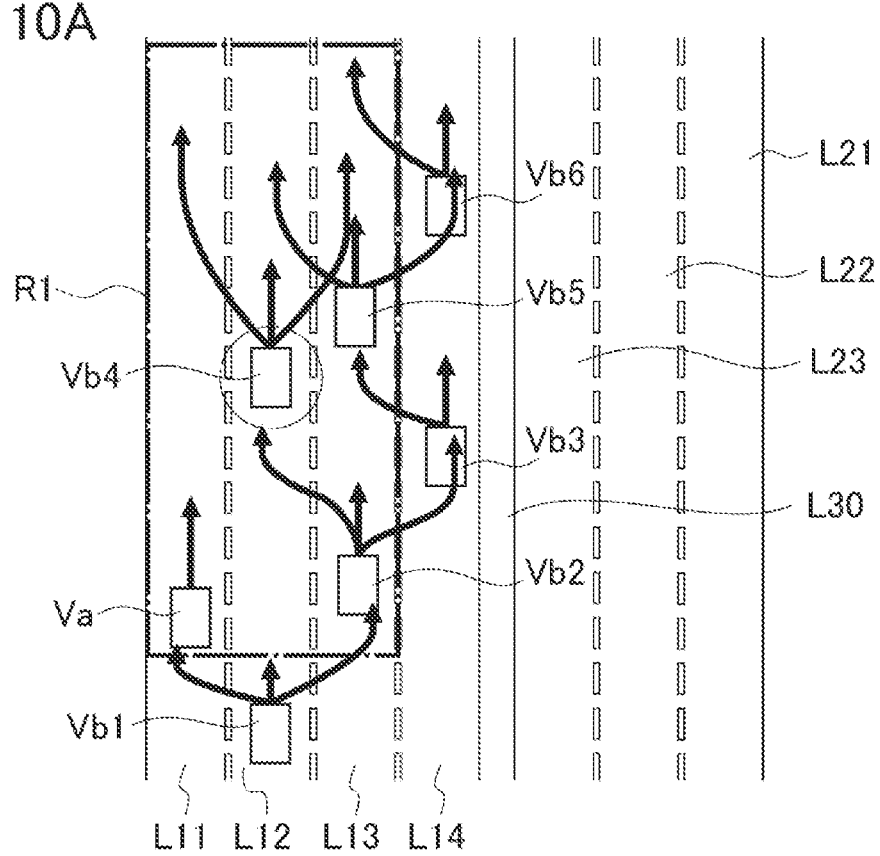
FIG. 10A is an explanatory diagram illustrating a concept of extracting a first object on a straight road
Figure 10B:
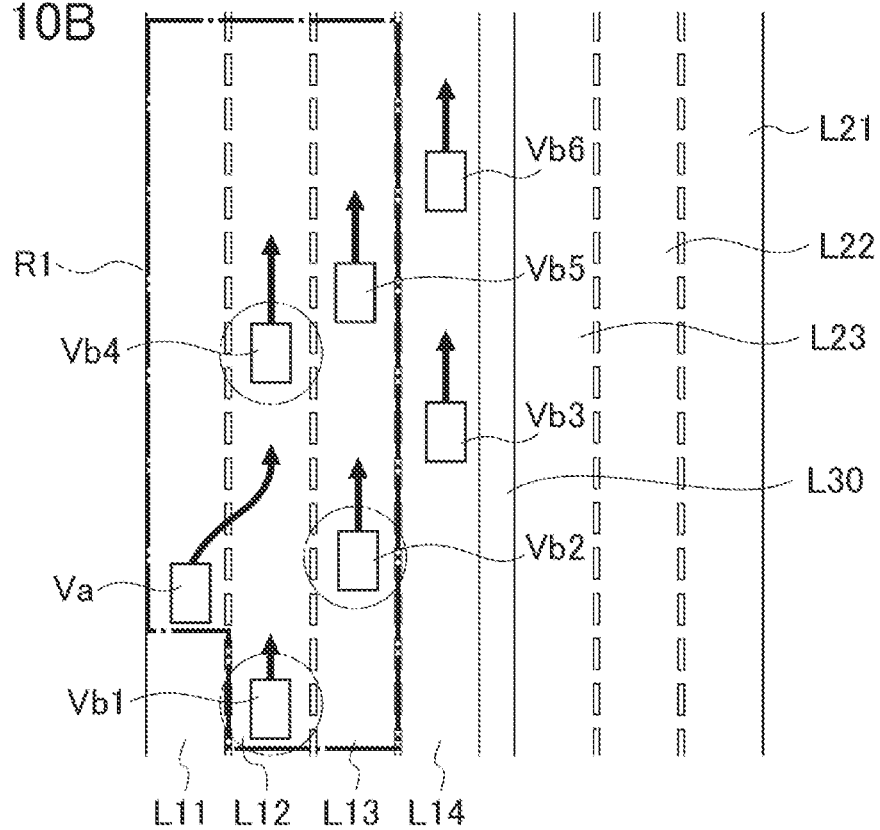
FIG. 10B is an explanatory diagram illustrating a concept of extracting a first object on a straight road

FIGS. 10A and 10B illustrate a traveling scene of the host-vehicle travelling on an expressway. In FIGS. 10A and 10B, travelling lanes are denoted with reference numerals L11 to L14, oncoming lanes are denoted with reference numerals L21 to L23, a median strip is denoted with a reference numeral L30 and a host-vehicle is denoted with a reference numeral Va. The host-vehicle Va travels on the travelling lane L11 at a side most close to a road shoulder, and 6 other vehicles Vb1 to Vb6 are present around the host-vehicle Va. In FIGS. 10A and 10B, a course of the host-vehicle Va and course candidates of other vehicles Vb1 to Vb6 are illustrated with arrows (course candidates of other vehicles Vb1 to Vb6 in FIG. 10B are the same as those in FIG. 10A, and thus, only straight ahead course candidates are illustrated).

First, a case where a course of the host-vehicle Va is straight ahead is assumed. As illustrated in FIG. 10, the object extraction unit 14 sets the first area R1 around the host-vehicle Va. The object extraction unit 14 extracts another vehicle Vb4 among other vehicles Vb2, Vb4 and Vb5 present in the first area R1 as a first object. This is because another vehicle Vb4 traveling on the travelling lane L12 has a course candidate of moving to the travelling lane L11 on which the host-vehicle Va travels straight by a lane change.

Next, a case where a course of the host-vehicle Va is moving from the travelling lane L11 to the travelling lane L12 by a lane change is assumed. As illustrated in FIG. 10B, the object extraction unit 14 sets the first area R1 around the host-vehicle Va. The object extraction unit 14 extracts, as first objects, other vehicles Vb1, Vb2 and Vb4 among other vehicles Vb1, Vb2, Vb4 and Vb5 present in the first area R1. This is because other vehicles Vb1 and Vb4 will be present forward and backward the host-vehicle Va on the travelling lane L12 to which the host-vehicle Va intends to move by a lane change. Further, the reason why another vehicle Vb2 is extracted as the first object is because another vehicle Vb2 traveling on the travelling lane L13 has a course candidate of moving to the travelling lane L12 to which the host-vehicle Va intends to move by a lane change.

The object extraction unit 14 may extract first objects by considering not only course candidates but also whether objects around the host-vehicle change the behavior of the host-vehicle Va. For example, as illustrated in FIG. 11, if another vehicle Vb4 moves to the travelling lane L11 by a lane change, another vehicle Vb4 comes to be located forward the host-vehicle Va. The object extraction unit 14 predicts an entry position when another vehicle Vb4 moves to the travelling lane L11 by a lane change, and determines whether a relative distance D2 between the host-vehicle Va and the entry position of another vehicle Vb4 is equal to or more than a predetermined value. The predetermined value is, for example, a distance in which the TTC is 3 seconds. If the relative distance D2 is equal to or more than the predetermined value, it is in a situation that the host-vehicle Va does not decelerate relative to another vehicle Vb4. Therefore, the object extraction unit 14 determines that another vehicle Vb4 does not affect the behavior of the host-vehicle Va, and thus, does not extract another vehicle Vb4 as the first object.

In step S18, the object extraction unit 14 sets a second area R2. The second area R2 is an area for extracting a second object that affects the behavior of the extracted first object. The second area R2 is set around a first object for each extracted first object. How to set the second area R2 may be the same as how to set the first area R1, or alternatively the second are R2 may be set within a predetermined range around the first object.

In step S19, the object extraction unit 14 determines whether an object is present in the set second area R2. If the object is present in the second area R2, it is determined as YES in step S19, and a process proceeds to step S20. On the other hand, if the object is absent in the second area R2, it is determined as NO in step S19, and a process proceeds to step S24.

In processes of steps S20 to S22, the object extraction unit 14 and the prediction unit 15 perform a prediction process of extracting a second object among a plurality of objects present in the second area R2 and predicting the behavior of the extracted second object (a prediction process for the first time). After the second object is extracted and the behavior of the second object is predicted, the object extraction unit 14 sets the second object whose behavior was predicted in the previous process as a new first object, sets the second area R2 for the new first object, and predicts the behavior of a second object (a new second object) present in the second area R2 (a new prediction process). The object extraction unit 14 and the prediction unit 15 perform the prediction process of extracting the second object and predicting the behavior of the second object, and the prediction process is repeated by a predetermined number of times (the number of extraction times). The detail will be described below.

In step S20, the object extraction unit 14 extracts the second object. The object extraction unit 14 does not determine second objects in all course candidates of the first object, but extracts the second objects by limiting the course candidates to course candidates that affect the behavior of the host-vehicle Va.

In step S21, the object extraction unit 14 predicts the behavior of the second object.

In step S22, the object extraction unit 14 determines whether the number of times to perform the prediction process of extracting the second objects and predicting the behaviors of the second objects reaches the number of times of extraction. If the number of times to perform the prediction process reaches the number of times of extraction, it is determined as YES in step S22, and a process proceeds to step S23. On the other hand, if the number of times to perform the prediction process does not reach the number of times of extraction, it is determined as NO in step S22 and a process returns to step S20. Then, in step S20, the object extraction unit 14 sets the second object whose behavior was predicted in the first prediction process (step S21 in the previous process) as a new first object, and sets the second area R2 for the new first object based on the same method as in step S18. The object extraction unit 14 extracts a new second object (i.e., an object that affects the behavior of an object as a new first object) present in the set second area R2. The prediction unit 15 predicts the behavior of the new second object extracted by the object extraction unit 14. In this way, the process of setting the second area R2 and the process of predicting the behavior of the second object are repeated.

Figure 12B:
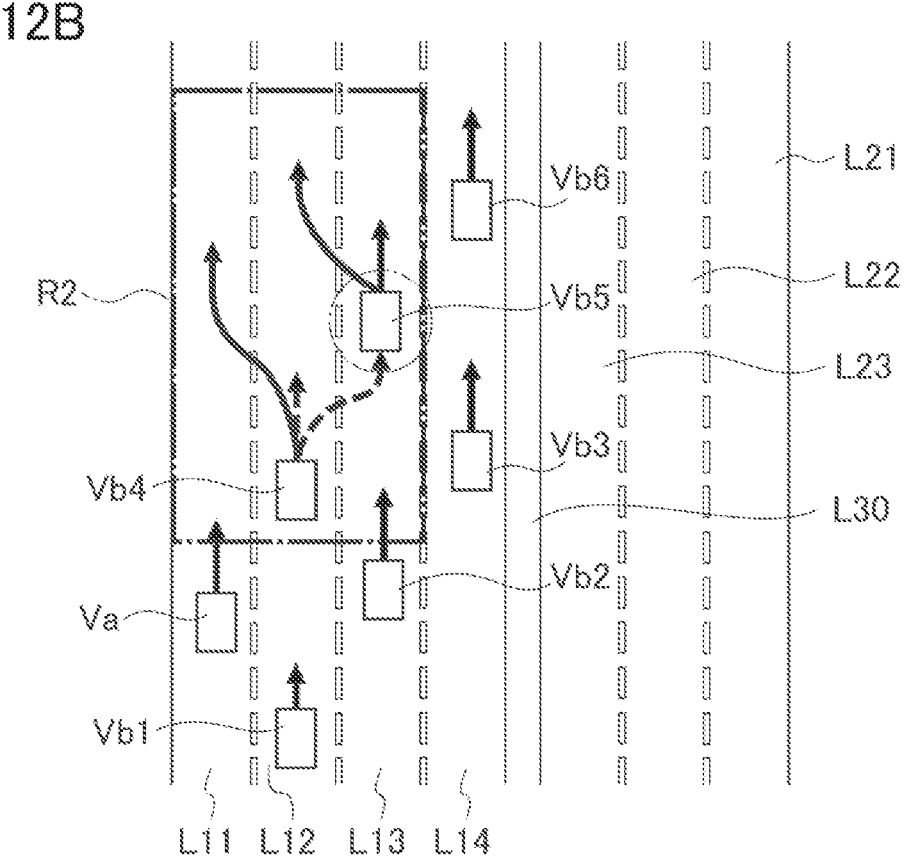
FIG. 12B is an explanatory diagram illustrating a concept of extracting a second object on a straight road.
Figure 12C:
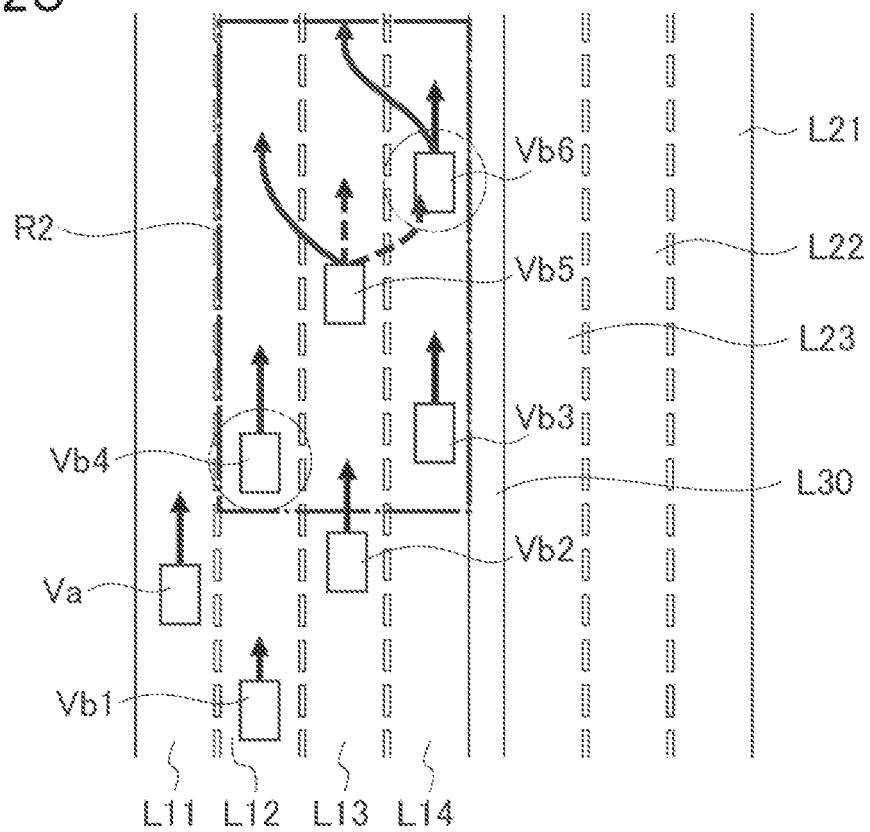
FIG. 12C is an explanatory diagram illustrating a concept of extracting a second object on a straight road.

FIGS. 12A to 12C illustrate a traveling scene of the host-vehicle Va travelling on an expressway, as in FIGS. 10A and 10B. As illustrated in FIG. 12A, the object extraction unit 14 extracts another vehicle Vb4 as a first object in the first area R1.

As illustrated in FIG. 12B, the object extraction unit 14 sets the second area R2 around the first object (another vehicle Vb4). In this example, the second area R2 is set to include a predetermined forward-backward range and a predetermined left-right range, and is set such that another vehicle Vb4 is positioned at the lower center. In FIG. 12B, as a course candidate of another vehicle Vb4, there is a course candidate (illustrated with a solid line) in which another vehicle Vb4 moves from the travelling lane L12 to the travelling lane L11 by a lane change. The object extraction unit 14 extracts, as the second object, another vehicle having a course candidate to which another vehicle Vb4 may take a course from objects present in the second area R2. In an example illustrated in FIG. 12B, another vehicle Vb5 has a course candidate of moving from the travelling lane L13 to the travelling lane L12 by a lane change. By being affected by another vehicle Vb5 moving to the travelling lane L12 by a lane change, it is possible that another vehicle Vb4 moves to the travelling lane L11 by a lane change. Therefore, the object extraction unit 14 extracts another vehicle Vb5 as the second object.

As illustrated in FIG. 12C, the object extraction unit 14 further sets a second object (another vehicle Vb5) as a new first object, and sets the second area R2 around the object. In this example, the second area R2 is set to include a predetermined forward-backward range and a predetermined left-right range, and is set such that another vehicle Vb5 is positioned at the center. Next, the object extraction unit 14 specifies a course candidate to which another vehicle Vb5 as the new first object may take a course. In FIG. 12C, there is a course candidate (illustrated with a solid line) of the vehicle moving from the travelling lane L13 to the travelling lane L12 by a lane change. The object extraction unit 14 extracts, as a new second object, another vehicle that has a course candidate to which another vehicle Vb5 may take a course, that is, another vehicle affecting the behavior of another vehicle Vb5, from the objects present in the second area R2. In an example illustrated in FIG. 12C, another vehicle Vb6 has a course candidate of moving from the travelling lane L14 to the travelling lane L13 by a lane change. On the other hand, another vehicle Vb4 has a course candidate of travelling straight along the travelling lane L12. By being affected by another vehicle Vb6 moving to the travelling lane L13 by a lane change, it is possible that another vehicle Vb5 moves to the travelling lane L12 by a lane change. Further, by being affected by a distance with another vehicle Vb4, it is possible that another vehicle Vb5 moves to the travelling lane L12 by a lane change. Therefore, the object extraction unit 14 also extracts other vehicles Vb4 and Vb6 as the second objects.

In this way, the extraction of a second object is also made for an object (another vehicle Vb5) that directly affects the behavior of the first object (another vehicle Vb4). In this case, another vehicle Vb4 is the first object whose behavior is affected by another vehicle Vb5 and also corresponds to the second object which affects the behavior of another vehicle Vb5.

Figure 13A:
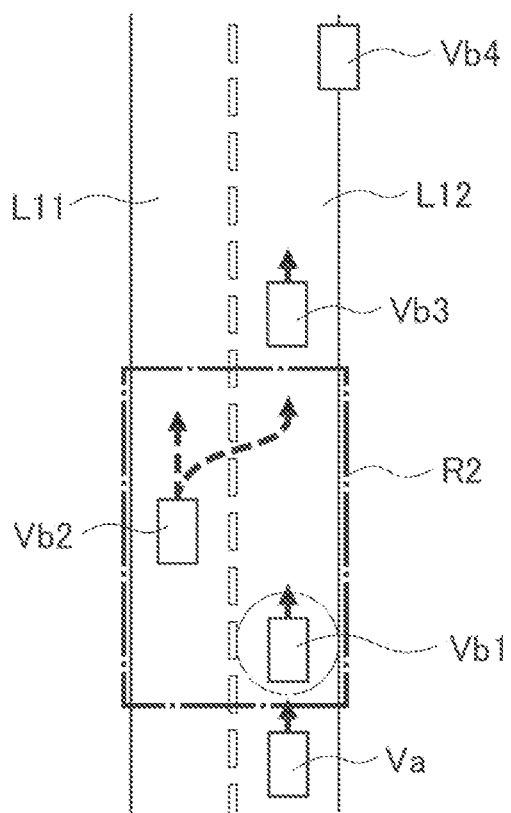
FIG. 13A is an explanatory diagram illustrating a concept of extracting a second object on a straight road.
Figure 13B:
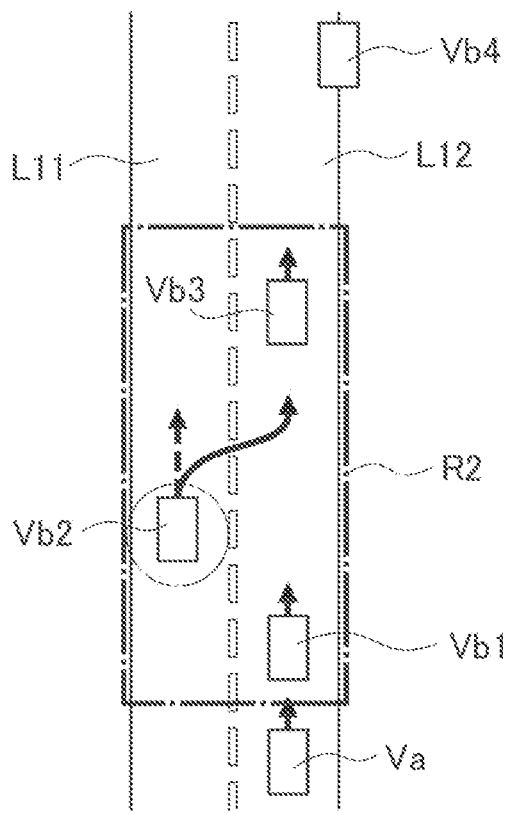
FIG. 13B is an explanatory diagram illustrating a concept of extracting a second object on a straight road.
Figure 13C:
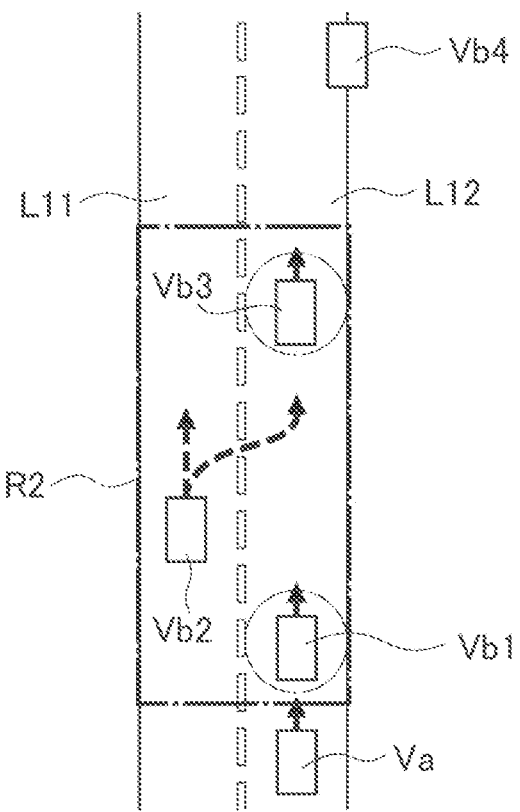
FIG. 13C is an explanatory diagram illustrating a concept of extracting a second object on a straight road

FIGS. 13A to 13C illustrate a scene of the host-vehicle Va travelling on an expressway. As illustrated in FIG. 13A, when extracting another vehicle Vb1 as the first object, the object extraction unit 14 sets the second area R2 around the first object (another vehicle Vb1). The object extraction unit 14 specifies a first affecting course candidate that affects the behavior of the host-vehicle Va among course candidates of another vehicle Vb1 as the first object. In FIG. 13A, a course candidate of a vehicle traveling straight on the travelling lane L12 corresponds to the first affecting course candidate. The object extraction unit 14 extracts, as a second object, another vehicle having a course candidate that may affect a course of the first affecting course candidate of another vehicle Vb1 from objects in the second area R2. In the example illustrated in FIG. 13A, another vehicle Vb2 has a course candidate of moving from the travelling lane L11 to the travelling lane L12 by a lane change. By being affected by another vehicle Vb2 moving to the travelling lane L12 by a lane change, it is possible that another vehicle Vb1 is forced to decelerate. Therefore, the object extraction unit 14 extracts another vehicle Vb2 as the second object.

As illustrated in FIG. 13B, the object extraction unit 14 sets another vehicle Vb2, which is a second object extracted as an object affecting the behavior of another vehicle Vb1, as a new first object, and further sets the second area R2 around the object. The object extraction unit 14 extracts a new second object which is an object affecting the behavior of the new first object (another vehicle Vb2), from the objects present in the second area R2. The object extraction unit 14 extracts other vehicles Vb1 and Vb3 that are new second objects as objects affecting the behavior of another vehicle Vb2 based on the course candidates of another vehicle Vb2 as the new first object. In FIG. 13B, as a course candidate of another vehicle Vb2 that is the new first object, there is a course candidate (illustrated with a solid line) of a vehicle moving from the travelling lane L11 to the travelling lane L12 by a lane change. The object extraction unit 14 extracts, as a new second object, another vehicle having a course candidate that may affect a course of another vehicle Vb2 from the objects present in the second area R2. In the example illustrated in FIG. 13B, each of other vehicles Vb1 and Vb3 has a course candidate of travelling straight on the travelling lane L11. By being affected by a distance between other vehicles Vb1 and Vb4, it is possible that another vehicle Vb2 moves to the travelling lane L12 by a lane change. Therefore, the object extraction unit 14 also extracts other vehicles Vb1 and Vb3 as the second objects (see FIG. 13C).

In this way, the extraction of a second object is also performed for an object (another vehicle Vb2) that directly affects the behavior of the first object (another vehicle Vb1). Note that in this case, another vehicle Vb2 corresponds to the first object whose behavior is affected by other vehicles Vb1 and Vb3, and also corresponds to the second object who affects the behavior of another vehicle Vb1.

In step S23, the prediction unit 15 predicts the behaviors of the object that is set as the first object for the first time based on the behaviors of n second objects corresponding to the number of times of extraction. That is, the prediction unit 15 predicts the behaviors of the object which is set as the first object for the first time based on the predicted behavior of the second object in each of n behavior predictions.

Figure 14A:
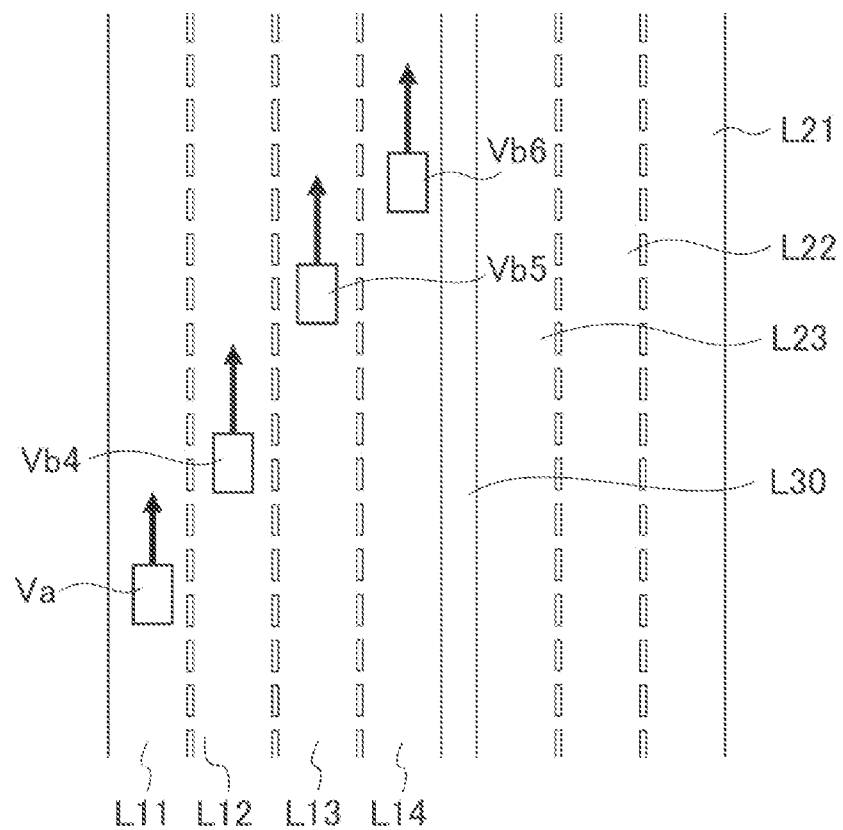
FIG. 14A is an explanatory diagram illustrating an object whose behavior is to be predicted.
Figure 14B:
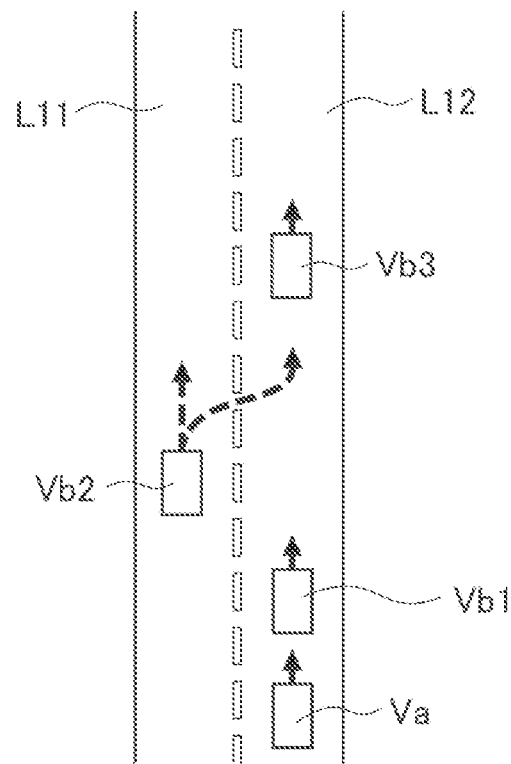
FIG. 14B is an explanatory diagram illustrating an object whose behavior is to be predicted.

FIG. 14A illustrates extraction results of the first object and the second object extracted in the examples of FIGS. 12A to 12C. That is, in the examples of FIGS. 12A to 12C, the first object directly affecting the behavior of the host-vehicle Va is another vehicle Vb4, and the second objects indirectly affecting the behavior of the host-vehicle Va are vehicles Vb5 and Vb6. Further, FIG. 14B illustrates extraction results of the first object and the second object extracted in the examples of FIGS. 13A to 13C. That is, in the examples of FIGS. 13A to 13C, the first object directly or indirectly affecting the behavior of the host-vehicle Va is another vehicle Vb1, and the second objects indirectly affecting the behavior of the host-vehicle Va are vehicles Vb2 and Vb3.

In step S24, the vehicle control unit 20 controls the host-vehicle based on the predicted behavior of the first object.

In step S25, the prediction unit 15 determines whether the ignition switch is turned off. If the ignition switch is turned off, it is determined as YES in step S25 and a series of processes are ended (END). On the other hand, if the ignition switch (IGN) is turned on, it is determined as NO in step S25, and a process returns to step S10.

As described above, the behavior prediction method and the behavior prediction apparatus according to the present embodiment specify the first object that affects the behavior of the host-vehicle Va among the objects around the host-vehicle Va. Further, the behavior prediction method and the behavior prediction apparatus according to the present embodiment perform the prediction process (the first prediction process) of extracting the second object affecting the behavior of the first object among the plurality of objects present around the first object, and predicting the behavior of the object. Thereafter, after setting the object extracted as the second object as a new first object, the prediction process (the new prediction process) of extracting the new second object affecting the behavior of the new first object among the plurality of objects present around the new first object and predicting the behavior of the object is performed. Then, the prediction process of extracting the second object and predicting the behavior of the second object is repeated by a predetermined number of extraction times. Accordingly, in the behavior prediction method and the behavior prediction apparatus according to the present embodiment, the behavior of the object as the first object for the first time (the first object in the first prediction process) is predicted based on the behaviors of n (n: natural numbers corresponding to the number of times of extraction) second objects subjected to the prediction process.

According to this method, the behaviors of the first object is predicted by additionally taking into consideration of the influence received by the first object from the objects around the first object. This enables the prediction of the behavior of the first object with high accuracy and the prediction of the situation around the host-vehicle Va in the long term.

In addition, even if the number of objects present around the host-vehicle Va is large, the number of times the prediction process is performed is limited to the number of times of extraction at a maximum. This can reduce an operation load and an operation time compared with the case where the prediction process is performed by the more number of times than the number of times of extraction. Thus, this can reduce an operation load and an operation time while acquiring the high prediction accuracy.

In the method according to the present embodiment, the host-vehicle Va may be controlled based on the predicted behavior of the first object.

According to this method, it is possible to control the host-vehicle Va by taking into consideration of the situation around the host-vehicle Va in the long term. This enables the appropriate control of the host-vehicle Va.

In the method according to the present embodiment, the first area R1 may be set around the host-vehicle Va based on the traveling state of the host-vehicle Va or the road environments, and the first object may be specified from the objects present in the first area R1.

According to this method, an area is limited to the first area R1 to specify the first object, and thus, the first object can be specified after selecting the object. This can reduce an operation load and an operation time while acquiring the high prediction accuracy. Further, the range of the first area R1 is set in accordance with the traveling state of the host-vehicle Va and the road environments, and thus, it is possible to appropriately cover a range in which an object affecting the behavior of the host-vehicle Va is present. Accordingly, the high prediction accuracy can be acquired.

Further, in the method according to the present embodiment, the forward-backward range of the first area R1 may be set depending on the speed of the host-vehicle Va.

According to this method, the forward-backward range of the first area R1 can be optimized depending on the speed of the host-vehicle Va. Accordingly, the high prediction accuracy can be acquired, because it is possible to appropriately cover the range in which the object affecting the behavior of the host-vehicle Va is present.

In the method according to the present embodiment, the road environment of the host-vehicle Va is an environment in which an intersecting point is present ahead of the host-vehicle Va. In this case, in the method according to the present embodiment, the left-right range of the first area R1 may be set based on the priority at the intersecting point set forth in the traffic rules.

According to this method, the left-right range of the first area R1 can be optimized based on the priority at the intersecting point. As a result, the high prediction accuracy can be acquired, because it is possible to appropriately cover the range in which the object affecting the behavior of the host-vehicle Va is present.

In the method according to the present embodiment, the left-right range of the first area R1 may be wider when the road Sa of the host-vehicle Va has a lower priority than the intersecting road Sb, than when the road Sa of the host-vehicle Va has a higher priority than the intersecting road Sb.

When an object enters a priority road from a non-priority road, the object needs to give priority to the traffic on the priority road. Therefore, if the priority of the host-vehicle Va is low, it is possible to appropriately cover the range in which the object affecting the behavior of the host-vehicle Va is present by increasing the left-right range of the area. Accordingly, the high prediction accuracy can be acquired.

If the priority of the road of the host-vehicle Va is unclear, the left-right range of the first area R1 may be wider when the priority of the road of the host-vehicle Va is unclear, than when the road Sa of the host-vehicle Va has a higher priority than the intersecting road Sb.

If the priority of the road of the host-vehicle Va is unclear, the assumption that the priority of the intersecting road is higher would better contribute to the safety. Therefore, if the priority is unclear, by increasing the left-right range of the area to be relatively large, it is possible to appropriately cover the range in which the object affecting the behavior of the host-vehicle Va is present. Accordingly, the high prediction accuracy can be acquired.

In the method according to the present embodiment, the road environment of the host-vehicle Va is a straight road. In this case, in the method according to the present embodiment, the left-right range of the first area R1 may be set based on a structure of a road shoulder of the straight road, or whether a pedestrian crosswalk for intersecting the straight road is present.

According to this method, the left-right range of the first area R1 can be optimized depending on the structure of the straight road. As a result, the high prediction accuracy can be acquired, because it is possible to appropriately cover the range in which the object affecting the behavior of the host-vehicle Va is present.

Further, in the method according to the present embodiment, the left-right range of the first area R1 may be set based on the number of lanes of the road on which the host-vehicle Va travels.

According to this method, the left-right range of the first area R1 can be optimized depending on the number of lanes of the road. As a result, the high prediction accuracy can be acquired, because it is possible to appropriately cover the range in which the object affecting the behavior of the host-vehicle Va is present.

In the method according to the present embodiment, the number of times of extraction may be set based on the degree of complexity due to the intersection of objects caused in the road environment in which the host-vehicle Va travels.

The mutual influences among the objects change depending on the degree of complexity due to the intersection of each object. Therefore by taking this degree of complexity into consideration, the prediction process can be performed by the number of times that is suitable for the road environment. Thus, in predicting the behavior of the first object, the influence of the second object can be appropriately reflected to the prediction of the behavior. As a result, the behavior of the first object can be predicted with high accuracy, and the situation around the host-vehicle Va can be predicted in the long term.

In the method according to the present embodiment, the number of times of extraction may be smaller when the host-vehicle Va travels on an expressway than when the host-vehicle Va travels on a general road.

The degree of complexity of traffic tends to be lower on the expressways with fewer intersecting roads than on the general road. Therefore, even if the number of times of extraction for the expressway is set to be smaller than that for the general road, the influence of the second object can be appropriately reflected. As a result, the behaviors of the first object can be predicted with high accuracy, and the situation around the host-vehicle Va can be predicted in the long term.

In the method according to the present embodiment, the number of times of extraction is larger when the host-vehicle Va travels at an intersecting point than when the host-vehicle Va travels on a straight road.

The environment with the intersecting point tends to have a higher degree of complexity of traffic than the environment without the intersecting point. Therefore, the influence of the second object can be appropriately reflected by increasing the number of times of extraction of the environment with the intersecting point to be larger than that of the environment without the intersecting point. As a result, the behavior of the first object can be predicted with high accuracy, and the situation around the host-vehicle Va can be predicted in the long term.

In the method according to the present embodiment, the specified number of times may be smaller when the host-vehicle Va travels a non-merging section than when the host-vehicle Va travels the merging section.

The environment with the merging section tends to have a higher degree of complexity of traffic than the environment without the merging section. Therefore, the influence of the second object can be appropriately reflected by increasing the number of times of extraction of the environment with the merging section to be larger than that of the environment without the merging lane. As a result, the behaviors of the first object can be predicted with high accuracy, and the situation around the host-vehicle Va can be predicted in the long term.

In the method according to the present embodiment, the specified number of times may be smaller when no traffic congestion occurs than when the traffic congestion occurs.

The degree of complexity of traffic tends to be lower in the environment where the traffic congestion occurs than the environment where no traffic congestion occurs. Therefore, even if the specified number of times when the traffic congestion occurs is set to be lower than that when no traffic congestion occurs, the influence of the second object can be appropriately reflected. As a result, the behavior of the first object can be predicted with high accuracy, and the situation around the host-vehicle Va can be predicted in the long term.

In the present embodiment, the object extraction unit 14 may exclude, from the extraction as the second object, an object having a relatively low influence on the behavior of the first object among the objects present in the second area R2.

Figure 15A:
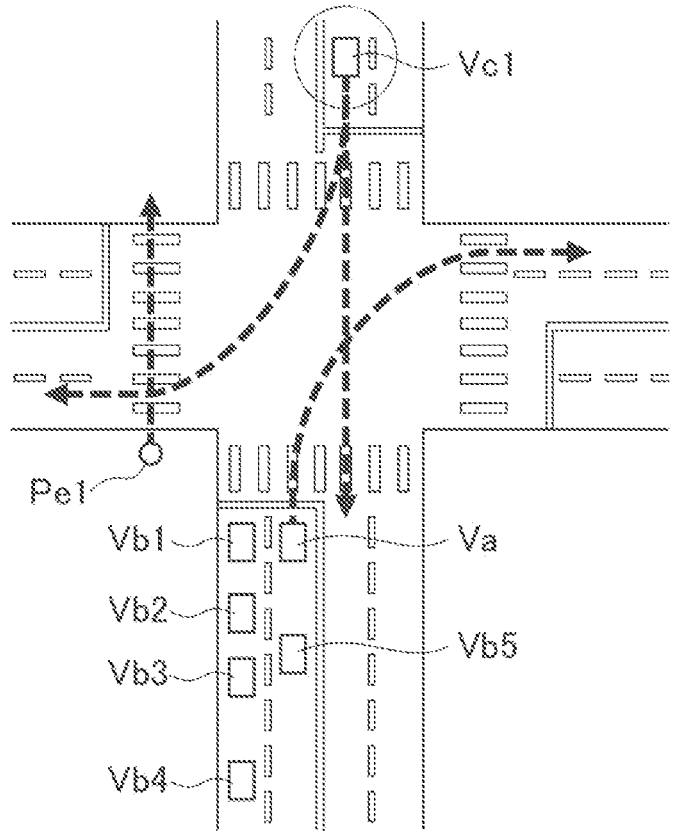
FIG. 15A is an explanatory diagram illustrating an example of excluding an object from extraction.

FIG. 15A illustrates a traveling scene of the host-vehicle Va travelling at the intersecting point. Around the intersecting point, there are other vehicles Vb1 to Vb4 travelling on a lane adjacent to the lane on which the host-vehicle Va travels, another vehicle Vb5 travelling backward the host-vehicle Va, an oncoming vehicle Vc1 traveling on the oncoming lane, and a pedestrian Pe1. The course of the host-vehicle Va is a right turn at the intersecting point.

If the oncoming vehicle Vc1 travels straight, the oncoming vehicle Vc1 comes to intersect the course of the host-vehicle Va, and thus, the object extraction unit 14 extracts the oncoming vehicle Vc1 as the first object. The pedestrian Pe1 and other vehicles Vb1 to Vb5 intersect a right turn course candidate of the oncoming vehicle Vc1. Accordingly, normally, the object extraction unit 14 extracts the pedestrian Pe1 and other vehicles Vb1 to Vb5 as the second objects.

Figure 15B:
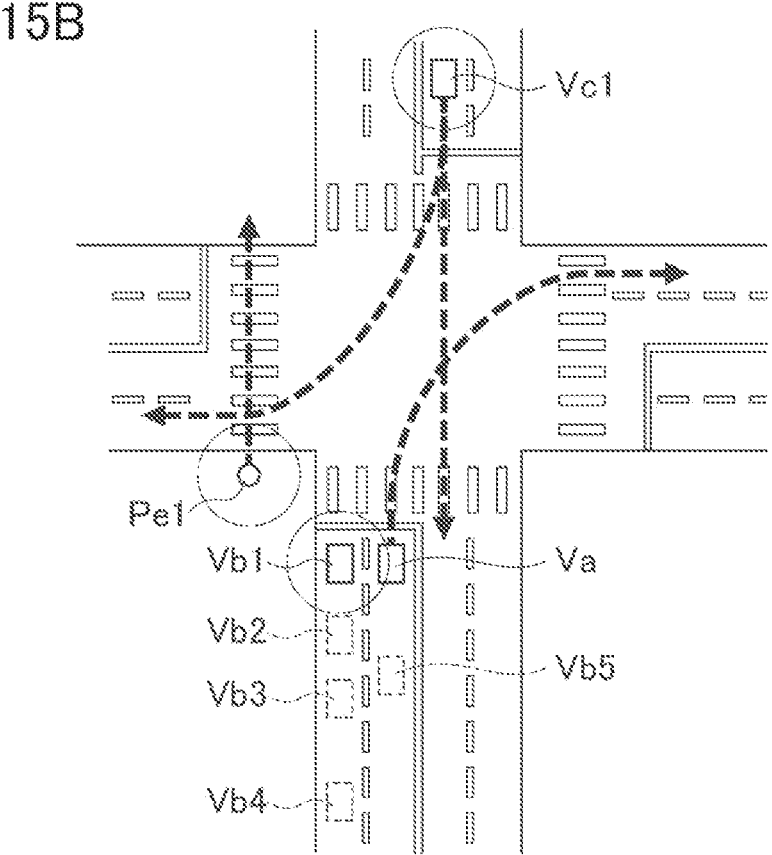
FIG. 15B is an explanatory diagram illustrating an example of excluding an object from extraction.

However, because of the presence of another vehicle Vb1, the vehicles travelling backward another vehicle Vb1 do not travel forward another vehicle Vb1. Further, even if any of other vehicles Vb2 to Vb5 moves a lane by a lane change, because of the presence of the host-vehicle Va, the vehicle that has moved the lane by a lane change does not travel forward the host-vehicle Va. Therefore, other vehicles Vb2 to Vb5 are less likely to intersect the oncoming vehicle Vc1. That is, other vehicles Vb2 to Vb5 among the pedestrian Pe1 and other vehicles Vb1 to Vb5 have a relatively low influence on the behavior of the first object (oncoming vehicle Vc1). Therefore, as illustrated in FIG. 15B, the object extraction unit 14 may exclude, from the extraction as the second object, other vehicles Vb2 to Vb5 having a relatively low influence on the behavior of the first object.

Figure 15C:
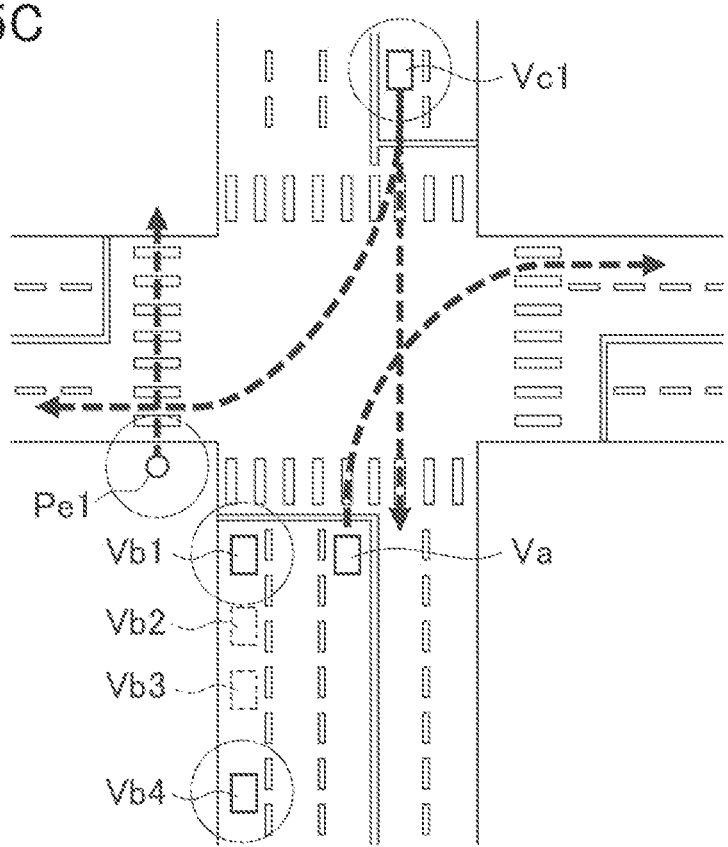
FIG. 15C is an explanatory diagram illustrating an example of excluding an object from extraction.

In the traveling scene illustrated in FIG. 15C, among other vehicles Vb2 to Vb4 travelling backward another vehicle Vb1, a distance between other vehicles Vb2 and Vb3 is short, and thus, a lane change is not possible. On the other hand, a distance between another vehicle Vb4 travelling backmost and another vehicle Vb3 is wide, and thus, another vehicle Vb4 can change a lane. In this case, if another vehicle Vb4 changes the lane, it is possible that another vehicle Vb4 comes to intersect the course candidate of the oncoming vehicle Vc1. In this case, another vehicle Vb4 has a relatively large influence on the behavior of the first object (oncoming vehicle Vc1), and thus, the object extraction unit 14 extracts another vehicle Vb4 as the second object.

According to this method, the second object having a high influence on the behaviors of the first object is extracted as a processing candidate, and thus, the influence of the second object can be appropriately reflected. As a result, the behaviors of the first object can be predicted with high accuracy, and the behaviors of the first object can be predicted in the long term.

In the method of the above-described embodiment, the prediction process of extracting the second object among the objects present in the second area R2 and predicting the behavior of the second object is repeated for the number of times of extraction. However, the method of repeating the prediction process by the number of times of extractions includes the method of repeating only the extraction of the second object by the number of times of extractions, and then predicting the behaviors of n extracted second objects, in addition to the method of repeating the extraction of the second object and the prediction of the behavior of the second object as a series of processes In the above-described embodiment, the method for predicting the behaviors of the first object present around the host-vehicle Va has been described. However, the behavior prediction method and the behavior prediction apparatus according to the present embodiment can be applied to the prediction of the behavior of the first object that is present around another vehicle as a vehicle other than the host-vehicle (another vehicle).

Although embodiments of the invention have been described as described above, the discussion and drawings forming part of this disclosure should not be construed as limiting the invention. Various alternative embodiments, examples, and operational techniques will be apparent to those skilled in the art from this disclosure.

REFERENCE SIGNS LIST

1. Object detection device
2. Detection integration unit
3. Object tracking unit
4. Host-vehicle position estimating device
5. Map acquisition device
6. Traffic rule acquisition device
7. Position-in-map estimation unit
10. Behavior prediction unit
11. Course candidate acquisition unit
12. Course acquisition unit
13. Traveling environment acquisition unit
14. Object extraction unit
15. Prediction unit
20. Vehicle control unit
50. Microcomputer

The invention claimed is:

1. A behavior prediction method for predicting a behavior of an object around a vehicle, the method comprising:
   detecting, by a sensor connected to a computer system, objects around the vehicle;
   specifying, by the computer system, a first object of the objects that affects a behavior of the vehicle;
   performing, by the computer system, a prediction process that includes a process of extracting a second object that affects a behavior of the first object among a plurality of objects present around the first object and predicting a behavior of the second object and a process of setting the extracted second object as a new first object, extracting a new second object that affects a behavior of the new first object and predicting a behavior of the new second object;
   repeating the prediction process by a predetermined number of extraction times;
   predicting, by the computer system, the behavior of the first object during a first prediction process based on the behaviors of the n (n: a natural number corresponding to the predetermined number of times) second objects subjected to the prediction process; and
   controlling the vehicle based on the predicted behavior of the first object.

2. The behavior prediction method according to claim 1, wherein
   a first area is set around the vehicle based on a traveling state of the vehicle or a road environment of the vehicle, and
   the first object is specified from an object within the first area.

3. The behavior prediction method according to claim 2, wherein
a forward-backward range of the first area is set depending on a speed of the vehicle.

4. The behavior prediction method according to claim 2, wherein
the road environment of the vehicle is an environment in which an intersecting point is present ahead of the vehicle, the intersecting point being a traffic junction where two or more routes converge, diverge, meet, or cross at a same height, and
a left-right range of the first area is set based on a priority at the intersecting point set forth in a traffic rule.

5. The behavior prediction method according to claim 4, wherein
the left-right range of the first area is wider when a road of the vehicle has a lower priority than an intersecting road, than when the road of the vehicle has a higher priority than the intersecting road.

6. The behavior prediction method according to claim 4, wherein
the left-right range of the first area is wider when the priority of a road of the vehicle is unclear than when the road of the vehicle has the higher priority than an intersecting road.

7. The behavior prediction method according to claim 2, wherein
the road environment of the vehicle is a straight road, and
a left-right range of the first area is set based on a road shoulder structure of the straight road or whether a pedestrian crosswalk for intersecting the straight road is present.

8. The behavior prediction method according to claim 2, wherein
a left-right range of the first area is set based on a number of lanes of a road on which the vehicle travels.

9. The behavior prediction method according to claim 1, wherein
the predetermined number of times is set based on a degree of complexity due to an intersection of objects caused in road environments of the vehicle.

10. The behavior prediction method according to claim 9, wherein
the predetermined number of times is smaller when the vehicle travels on an expressway than when the vehicle travels on a general road.

11. The behavior prediction method according to claim 9, wherein
the predetermined number of times is larger when the vehicle travels at an intersecting point than when the vehicle travels on a straight road, the intersecting point being a traffic junction where two or more routes converge, diverge, meet, or cross at the same height.

12. The behavior prediction method according to claim 9, wherein
the predetermined number of times is smaller when the vehicle travels in a non-merging section than when the vehicle travels in a merging section.

13. The behavior prediction method according to claim 9, wherein
the predetermined number of times is smaller when no traffic congestion occurs than when a traffic congestion occurs.

14. The behavior prediction method according to claim 1, wherein
a second area for extracting the second object is set around the first object, and
an object with a relatively low influence on the behavior of the first object among objects present in the second area is excluded from an extraction as the second object.

15. A behavior prediction apparatus for predicting a behavior of an object around a vehicle, the apparatus comprising:
a sensor for detecting objects around the vehicle; and
an information processing circuit forming part of a computer system for predicting the behavior of a first object of the objects around the vehicle, wherein the information processing circuit:
specifies a first object that affects a behavior of the vehicle among the objects;
performs a prediction process that includes a process of extracting a second object that affects a behavior of the first object among a plurality of objects present around the first object and predicting a behavior of the second object and the process of setting the extracted second object as a new first object, extracting a new second object that affects a behavior of the new first object and predicting a behavior of the new second object, repeats the prediction process by a predetermined number of times;
predicts the behavior of the first object in a first prediction process based on a behavior of n (n: a natural number corresponding to the predetermined number of times) second objects subjected to the prediction process; and
controls the vehicle based on the predicted behavior of the first object.

16. A vehicle control apparatus comprising:
a sensor for detecting objects around a vehicle; and
an information processing circuit for predicting a behavior of a first object of the objects and controlling the vehicle based on the behavior of the first object, wherein the information processing circuit:
specifies the first object that affects a behavior of the vehicle among the objects;
performs a prediction process that includes a process of extracting a second object that affects a behavior of the first object among a plurality of objects present around the first object and predicting a behavior of the second object and a process of setting the extracted second object as a new first object, extracting a new second object that affects a behavior of the new first object, and predicting a behavior of the new second object;
repeats the prediction process by a predetermined number of times;
predicts the behavior of the first object in the first prediction process based on a behavior of the n (n: a natural number corresponding to the predetermined number of times) second objects subjected to the prediction process; and
controls the host-vehicle based on the predicted behavior of the first object.

* * * * *